United States Patent
Carmichael et al.

(10) Patent No.: US 11,603,608 B2
(45) Date of Patent: Mar. 14, 2023

(54) TUFTED PILE FABRIC AS FRAMEWORK FOR STRETCHABLE AND WEARABLE COMPOSITE ELECTRODES

(71) Applicant: University of Windsor, Windsor (CA)

(72) Inventors: Tricia Breen Carmichael, Windsor (CA); Yunyun Wu, Windsor (CA)

(*) Notice: Subject to any disclaimer, the term of this patent is extended or adjusted under 35 U.S.C. 154(b) by 0 days.

(21) Appl. No.: 17/105,859

(22) Filed: Nov. 27, 2020

(65) Prior Publication Data

US 2021/0164137 A1 Jun. 3, 2021

Related U.S. Application Data

(60) Provisional application No. 62/941,987, filed on Nov. 29, 2019.

(51) Int. Cl.
| | | |
|---|---|---|
| H01M 4/139 | (2010.01) | |
| D04B 21/04 | (2006.01) | |
| C23C 18/54 | (2006.01) | |
| D05C 17/02 | (2006.01) | |
| H01M 4/74 | (2006.01) | |
| D06M 11/51 | (2006.01) | |
| D04B 1/04 | (2006.01) | |
| C23C 18/08 | (2006.01) | |

(52) U.S. Cl.
CPC .............. *D04B 21/04* (2013.01); *C23C 18/08* (2013.01); *C23C 18/54* (2013.01); *D04B 1/04* (2013.01); *D05C 17/023* (2013.01); *D06M 11/51* (2013.01); *H01M 4/139* (2013.01); *H01M 4/747* (2013.01)

(58) Field of Classification Search
CPC ........ H01M 4/747; H01M 4/74; H01M 4/139; D04B 21/04
See application file for complete search history.

(56) References Cited

U.S. PATENT DOCUMENTS

2019/0207218 A1* 7/2019 Zheng .................... C23C 18/30

OTHER PUBLICATIONS

Zhao, Y.; Zhai, Q.; Dong, D.; An, T.; Gong, S.; Shi, Q.; Cheng, W. Highly Stretchable and Strain-Insensitive Fiber-Based Wearable Electrochemical Biosensor to Monitor Glucose in the Sweat. Anal. Chem. 2019, 91, 6569-6576.

Coppedè, N.; Tarabella, G.; Villani, M.; Calestani, D.; Iannotta, S.; Zappettini, A. Human Stress Monitoring through an Organic Cotton-Fiber Biosensor. J. Mater. Chem. B 2014, 2, 5620-5626.

Atalay, A.; Sanchez, V.; Atalay, O.; Vogt, D. M.; Haufe, F.; Wood, R. J.; Walsh, C. J. Batch Fabrication of Customizable Silicone-Textile Composite Capacitive Strain Sensors for Human Motion Tracking. Adv. Mater. Technol. 2017, 2, 1700136.

(Continued)

*Primary Examiner* — Tabassom Tadayyon Eslami

(57) ABSTRACT

In a preferred embodiment, there is provided a modified fabric composition, the composition comprising a fabric member and an electroactive member for storing energy, wherein the fabric member comprises a fabric framework defining a deformable plane and a plurality of projections extending at an angle from the plane, and wherein the electroactive member is coupled to at least one of the projections.

7 Claims, 20 Drawing Sheets

(56) References Cited

OTHER PUBLICATIONS

Liu, M.; Pu, X.; Jiang, C.; Liu, T.; Huang, X.; Chen, L.; Du, C.; Sun, J.; Hu, W.; Wang, Z. Large-Area All-Textile Pressure Sensors for Monitoring Human Motion and Physiological Signals. Adv. Mater. 2017, 29, 1703700.
Wang, L.; Wang, L. Y.; Zhang, Y.; Pan, J.; Li, S. Y.; Sun, X. M.; Zhang, B.; Peng, H. S. Weaving Sensing Fibers into Electrochemical Fabric for Real-Time Health Monitoring. Adv. Funct. Mater. 2018, 28, 1804456.
Wu, Y.; Mechael, S. S.; Lerma, C.; Carmichael, S. R.; Carmichael, T. Stretchable Ultrasheer Fabrics as Semitransparent Electrodes for Wearable Light-Emitting E-Textiles with Changeable Display Patterns. Matter 2020, 2, 882-895.
Zhang, Z.; Cui, L.; Shi, X.; Tian, X.; Wang, D.; Gu, C.; Chen, E.; Cheng, X.; Xu, Y.; Hu, Y.; Zhang, J.; Zhou, L.; Fong, H.; Ma, P.; Jiang, G.; Sun, X.; Zhang, B.; Peng, H. Textile Display for Electronic and Brain-Interfaced Communications. Adv. Mater. 2018, 30, 1800323.
Wu, Y.; Mechael, S. S.; Chen, Y.; Carmichael, T. Solution Deposition of Conformal Gold Coatings on Knitted Fabric for E-Textiles and Electroluminescent Clothing. Adv. Mater. Technol. 2018, 3, 1700292.
Zhang, Z.; Shi, X.; Lou, H.; Xu, Y.; Zhang, J.; Li, Y.; Cheng, X.; Peng, H. A Stretchable and Sensitive Light-Emitting Fabric. J. Mater. Chem. C 2017, 5, 4139-4144.
Hu, L. B.; Pasta, M.; La Mantia, F.; Cui, L. F.; Jeong, S.; Deshazer, H. D.; Choi, J. W.; Han, S. M.; Cui, Y. Stretchable, Porous, and Conductive Energy Textiles. Nano Lett. 2010, 10, 708-714.
Pu, X.; Liu, M. M.; Li, L. X.; Han, S. C.; Li, X. L.; Jiang, C. Y.; Du, C. H.; Luo, J. J.; Hu, W. G.; Wang, Z. L. Wearable Textile-Based in-Plane Microsupercapacitors. Adv. Energy Mater. 2016, 6, 1601254.
Yang, Y.; Huang, Q. Y.; Niu, L. Y.; Wang, D. R.; Yan, C.; She, Y. Y.; Zheng, Z. J. Waterproof, Ultrahigh Areal-Capacitance, Wearable Supercapacitor Fabrics. Adv. Mater. 2017, 29, 1606679.
Levitt, A.; Hegh, D.; Phillips, P.; Uzun, S.; Anayee, M.; Razal, J. M.; Gogotsi, Y.; Dion, G. 3D Knitted Energy Storage Textiles Using Mxene-Coated Yarns. Mater. Today 2020, 34, 17-29.
Xiong, J. Q.; Lee, P. S. Progress on Wearable Triboelectric Nanogenerators in Shapes of Fiber, Yarn, and Textile. Sci. Technol. Adv. Mater. 2019, 20, 837-857.
Pan, S. W.; Yang, Z. B.; Chen, P. N.; Deng, J.; Li, H. P.; Peng, H. S. Wearable Solar Cells by Stacking Textile Electrodes. Angew. Chem. Int. Ed. 2014, 53, 6110-6114.
Lee, S.; Lee, Y.; Park, J.; Choi, D. Stitchable Organic Photovoltaic Cells with Textile Electrodes. Nano Energy 2014, 9, 88-93.
Li, R.; Xiang, X.; Tong, X.; Zou, J. Y.; Li, Q. W. Wearable Double-Twisted Fibrous Perovskite Solar Cell. Adv. Mater. 2015, 27, 3831-3835.
Etacheri, V.; Marom, R.; Elazari, R.; Salitra, G.; Aurbach, D. Challenges in the Development of Advanced Li-Ion Batteries: A Review. Energy Environ. Sci. 2011, 4, 3243-3262.
Tu, F. Z.; Han, Y.; Du, Y. C.; Ge, X. F.; Weng, W. S.; Zhou, X. S.; Bao, J. C. Hierarchical Nanospheres Constructed by Ultrathin MoS2 Nanosheets Braced on Nitrogen-Doped Carbon Polyhedra for Efficient Lithium and Sodium Storage. ACS Appl. Mater. Interfaces 2019, 11, 2112-2119.
Weng, W. S.; Xu, J. Y.; Lai, C. L.; Xu, Z. H.; Du, Y. C.; Lin, J.; Zhou, X. S. Uniform Yolk-Shell Fe7S8@C Nanoboxes as a General Host Material for the Efficient Storage of Alkali Metal Ions. J. Alloys Compd. 2020, 817, 152732.
Nitta, N.; Wu, F. X.; Lee, J. T.; Yushin, G. Li-Ion Battery Materials: Present and Future. Mater. Today 2015, 18, 252-264.
Ren, J.; Li, L.; Chen, C; Chen, X.; Cai, Z.; Qiu, L.; Wang, Y.; Zhu, X.; Peng; H. Twisting Carbon Nanotube Fibers for Both Wire-Shaped Micro-Supercapacitor and Micro-Battery. Adv. Mater. 2013, 25, 1155-1159.
Zhang, Y.; Bai, W.; Cheng, X.; Ren, J.; Weng, W.; Chen, P.; Fang, X.; Zhang, Z.; Peng, H. Flexible and Stretchable Lithium-Ion Batteries and Supercapacitors Based on Electrically Conducting Carbon Nanotube Fiber Spring. Angew. Chem. Int. Ed. 2014, 53, 14564-14568.
Wang, L.; Fu, X.; He, J.; Shi, X.; Chen, T.; Chen, P.; Wang, B.; Peng, H. Application Challenges in Fiber and Textile Electronics. Adv. Mater. 2020, 32, 1901971.
Rogers, J. A.; Someya, T.; Huang, Y. Materials and Mechanics for Stretchable Electronics. Science 2010, 327, 1603-1607.
Khang, D.-Y.; Jiang, H.; Huang, Y.; Rogers, J. A. A Stretchable Form of Single-Crystal Silicon for High-Performance Electronics on Rubber Substrates. Science 2006, 311, 208-212.
Sun, Y.; Choi, W.; Jiang, H.; Huang, Y. Y.; Rogers, J. A. Controlled Buckling of Semiconductor Nanoribbons for Stretchable Electronics. Nat. Nanotechnol. 2006, 1, 201-207.
Mechael, S. S.; Wu, Y.; Schlingman, K.; Carmichael, T. Stretchable Metal Films. Flex. Print. 2018, 3, 43001.
Kim, D.-H.; Song, J.; Choi, W.; Kim, H.-S.; Kim, R.-H.; Liu, Z.; Huang, Y. Y.; Hwang, K.-C.; Zhang, Y.-w.; Rogers, J. A. Materials and Noncoplanar Mesh Designs for Integrated Circuits with Linear Elastic Responses to Extreme Mechanical Deformations. Proc. Natl. Acad. Sci. U.S.A. 2008, 105, 18675-18680.
Weng, W.; Sun, Q.; Zhang, Y.; He, S.; Wu, Q.; Deng, J.; Fang, X.; Guan, G.; Ren, J.; Peng, H. A Gum-Like Lithium-Ion Battery Based on a Novel Arched Structure. Adv. Mater. 2015, 27, 1363-1369.
Liu, W.; Chen, J.; Chen, Z.; Liu, K.; Zhou, G.; Sun, Y.; Song, M. S.; Bao, Z.; Cui, Y. Stretchable Lithium-Ion Batteries Enabled by Device-Scaled Wavy Structure and Elastic-Sticky Separator. Adv. Energy Mater. 2017, 7, 1701076.
Gu, T.; Cao, Z.; Wei, B. All-Manganese-Based Binder-Free Stretchable Lithium-Ion Batteries. Adv. Energy Mater. 2017, 7, 1700369.
Yu, Y.; Luo, Y.; Wu, H.; Jiang, K.; Li, Q.; Fan, S.; Li, J.; Wang, J. Ultrastretchable Carbon Nanotube Composite Electrodes for Flexible Lithium-Ion Batteries. Nanoscale 2018, 10, 19972-19978.
Xu, S.; Zhang, Y.; Cho, J.; Lee, J.; Huang, X.; Jia, L.; Fan, J. A.; Su, Y.; Su, J.; Zhang, H.; Cheng, H.; Lu, B.; Yu, C.; Chuang, C.; Kim, T.-I. I.; Song, T.; Shigeta, K.; Kang, S.; Dagdeviren, C.; Petrov, I.; Braun, P. V.; Huang, Y.; Paik, U.; Rogers, J. A. Stretchable Batteries with Self-Similar Serpentine Interconnects and Integrated Wireless Recharging Systems. Nat. Commun. 2013, 4, 1543.
Yin, L.; Seo, J.; Kurniawan, J.; Kumar, R.; Lv, J.; Xie, L.; Liu, X.; Xu, S.; Meng, Y. S.; Wang, J. Highly Stable Battery Pack via Insulated, Reinforced, Buckling-Enabled Interconnect Array. Small 2018, 14, 1800938.
Wang, L.; Zhang, Y.; Pan, J.; Peng, H. S. Stretchable Lithium-Air Batteries for Wearable Electronics. J. Mater. Chem. A 2016, 4, 13419-13424.
Min, X.; Sun, B.; Chen, S.; Fang, M.; Wu, X.; Liu, Y. g.; Abdelkader, A.; Huang, Z.; Liu, T.; Xi, K.; Kumar, V. R. A Textile-Based SnO2 Ultra-Flexible Electrode for Lithium-Ion Batteries. Energy Storage Mater. 2019, 16, 597-606.
Ha, S.; Shin, K.; Park, H.; Lee, Y. Flexible Lithium-Ion Batteries with High Areal Capacity Enabled by Smart Conductive Textiles. Small 2018, 14, 1703418.
Ma, K.; Liu, X.; Cheng, Q.; Saha, P.; Jiang, H.; Li, C. Flexible Textile Electrode with High Areal Capacity from Hierarchical V2O5 Nanosheet Arrays. J. Power Sources 2017, 357, 71-76.
Balogun, M.-S.; Yu, M.; Huang, Y.; Li, C.; Fang, P.; Liu, Y.; Lu, X.; Tong, Y. Binder-Free Fe2N Nanoparticles on Carbon Textile with High Power Density as Novel Anode for High-Performance Flexible Lithium Ion Batteries. Nano Energy 2015, 11, 348-355.
Liu, B.; Zhang, J.; Wang, X.; Chen, G.; Chen, D.; Zhou, C.; Shen, G. Hierarchical Three-Dimensional ZnCo2O4 Nanowire Arrays/ Carbon Cloth Anodes for a Novel Class of High-Performance Flexible Lithium-Ion Batteries. Nano Lett. 2012, 12, 3005-3011.
Zhu, Y.; Yang, M.; Huang, Q.; Wang, D.; Yu, R.; Wang, J.; Zheng, Z.; Wang, D. V2O5 Textile Cathodes with High Capacity and Stability for Flexible Lithium-Ion Batteries. Adv. Mater. 2020, 1906205.
Lee, Y.-H.; Kim, J.-S.; Noh, J.; Lee, I.; Kim, H.; Choi, S.; Seo, J.; Jeon, S.; Kim, T.-S.; Lee, J.-Y.; Choi, J. Wearable Textile Battery Rechargeable by Solar Energy. Nano Lett. 2013, 13, 5753-5761.

(56) References Cited

OTHER PUBLICATIONS

Lee, K.; Choi, J.; Lee, H.; Kim, K.; Choi, J. Solution-Processed Metal Coating to Nonwoven Fabrics for Wearable Rechargeable Batteries. Small 2017, 14, 1703028.

Kang, C.; Choi, J.; Ko, Y.-J.; Lee, S.; Kim, H.; Kim, J.; Son, S. Thin Coating of Microporous Organic Network Makes a Big Difference: Sustainability Issue of Ni Electrodes on the PET Textile for Flexible Lithium-Ion Batteries. ACS Appl. Mater. Interfaces 2017, 9, 36936-36943.

Ghadi, B.; Yuan, M.; Ardebili, H. Stretchable Fabric-Based LiCoO2 Electrode for Lithium Ion Batteries. Extreme Mech. Lett. 2019, 32, 100532.

Chen, Y.; Wu, Y.; Mechael, S. S.; Carmichael, T. Heterogeneous Surface Orientation of Solution-Deposited Gold Films Enables Retention of Conductivity with High Strain—A New Strategy for Stretchable Electronics. Chem. Mater. 2019, 31, 1920-1927.

Liu, H.; Li, N.; Bi, S.; Li, D. Gold Immersion Deposition on Electroless Nickel Substrates Deposition Process and Influence Factor Analysis. J. Electrochem. Soc. 2007, 154, D662-D668.

Osaka, T.; Takematsu, H.; Nihei, K. A Study on Activation and Acceleration by Mixed PdCl2—SnCl2 Catalysts for Electroless Metal-Deposition. J. Electrochem. Soc. 1980, 127, 1021-1029.

Miller, M. S.; Davidson, G. J. E.; Sahli, B. J.; Mailloux, C. M.; Carmichael, T. B. Fabrication of Elastomeric Wires by Selective Electroless Metallization of Poly(Dimethylsiloxane). Adv. Mater. 2008, 20, 59-64.

Baum, T. H. Photochemically Generated Gold Catalyst for Selective Electroless Plating of Copper. J. Electrochem. Soc. 1990, 137, 252-255.

Lei, Y.; Jia, H.; Zheng, Z.; Gao, Y.; Chen, X.; Hou, H. A Very Facile, Low Temperature, One-Step Route to In Situ Fabricate Copper Sulfide Nanosheet Thin Films. CrystEngComm 2011, 13, 6212-6217.

Zhao, J.; Zhang, Y.; Wang, Y.; Li, H.; Peng, Y. The Application of Nanostructured Transition Metal Sulfides as Anodes for Lithium Ion Batteries. J. Energy Chem. 2018, 27, 1536-1554.

Lu, Y.; Li, B.; Zheng, S.; Xu, Y.; Xue, H.; Pang, H. Syntheses and Energy Storage Applications of MXSY (M=Cu, Ag, Au) and Their Composites: Rechargeable Batteries and Supercapacitors. Adv. Funct. Mater. 2017, 27, 1703694.

Jiang, K.; Chen, Z.; Meng, X. CuS and Cu2S as Cathode Materials for Lithium Batteries: A Review. ChemElectroChem 2019, 6, 2825-2840.

Chen, Y.; Li, J.; Lei, Z.; Huo, Y.; Yang, L.; Zeng, S.; Ding, H.; Qin, Y.; Jie, Y.; Huang, F.; Li, Q.; Zhu, J.; Cao, R.; Zhang, G.; Jiao, S.; Xu, D. Hollow CuS Nanoboxes as Li-Free Cathode for High-Rate and Long-Life Lithium Metal Batteries. Adv. Energy Mater. 2020, 10, 1903401.

Li, H.; Wang, Y.; Huang, J.; Zhang, Y.; Zhao, J. Microwave-Assisted Synthesis of CuS/Graphene Composite for Enchanced Lithium Storage Properties. Electrochim. Acta. 2017, 225, 443-451.

Du, Y.; Yin, Z.; Zhu, J.; Huang, X.; Wu, X.-J.; Zeng, Z.; Yan, Q.; Zhang, H. A General Method for the Large-Scale Synthesis of Uniform Ultrathin Metal Sulphide Nanocrystals. Nat. Commun. 2012, 3, 1177.

Kalimuldina, G.; Taniguchi, I. Electrochemical Properties of Stoichiometric CuS Coated on Carbon Fiber Paper and Cu Foil Current Collectors as Cathode Material for Lithium Batteries. J. Mater. Chem. A 2017, 5, 6937-6946.

Chen, Y.; Davoisne, C.; Tarascon, J.-M.; Guéry, C. Growth of Single-Crystal Copper Sulfide Thin Films via Electrodeposition in Ionic Liquid Mediator Lithium Ion Batteries. J. Mater. Chem. 2012, 22, 5295.

Chung, J. S.; Sohn, H. J. Electrochemical Behaviors of CuS as a Cathode Material for Lithium Secondary Batteries. J. Power Sources 2002, 108, 226-231.

Fan, C.-Y.; Xiao, P.; Li, H.-H.; Wang, H.-F.; Zhang, L.-L.; Sun, H.-Z.; Wu, X.-L.; Xie, H.-M.; Zhang, J.-P. Nanoscale Polysulfides Reactors Achieved by Chemical Au—S Interaction: Improving the Performance of Li—S Batteries on the Electrode Level. ACS Appl. Mater. Interfaces 2015, 7, 27959-27967.

Kim, S.; Oh, K.; Bahk, J. Electrochemically Synthesized Polypyrrole and Cu-Plated Nylon/Spandex for Electrotherapeutic Pad Electrode. J. Appl. Polym. Sci. 2004, 91, 4064-4071.

Sun, P.; Qiu, M.; Li, M.; Mai, W.; Cui, G.; Tong, Y. Stretchable Ni@NiCoP Textile for Wearable Energy Storage Clothes. Nano Energy 2019, 55, 506-515.

Huang, X.; Cai, X.; Xu, D.; Chen, W.; Wang, S.; Zhou, W.; Meng, Y.; Fang, Y.; Yu, X. Hierarchical Fe2O3@CNF Fabric Decorated with MoS2 Nanosheets as a Robust Anode for Flexible Lithium-Ion Batteries Exhibiting Ultrahigh Areal Capacity. Journal of Materials Chemistry A 2018, 6 (35), 16890-16899.

Zhang, C.; Zhu, J.; Lin, H.; Huang, W. Flexible Fiber and Fabric Batteries. Advanced Materials Technologies 2018, 3 (10), 1700302.

Tessarolo, M.; Gualandi, I.; Fraboni, B. Recent Progress in Wearable Fully Textile Chemical Sensors. Advanced Materials Technologies 2018, 3 (10), 1700310.

Li, H.; Ding, Y.; Ha, H.; Shi, Y.; Peng, L.; Zhang, X.; Ellison, C.; Yu, G. An All-Stretchable-Component Sodium-Ion Full Battery. Advanced Materials 2017, 29 (23), 1700898.

Zhou, A.; Sim, R.; Luo, Y.; Gao, X. High-Performance Stretchable Electrodes Prepared from Elastomeric Current Collectors and Binders. Journal of Materials Chemistry A 2017, 5 (40), 21550-21559.

Deng, Z.; Jiang, H.; Hu, Y.; Liu, Y.; Zhang, L.; Liu, H.; Li, C. 3D Ordered Macroporous MoS2@C Nanostructure for Flexible Li-Ion Batteries. Advanced Materials 2017, 29 (10), 1603020.

Huang, Q.; Wang, D.; Zheng, Z. Textile-Based Electrochemical Energy Storage Devices. Advanced Energy Materials 2016, 6 (22), 1600783.

Zhai, S.; Karahan, E.; Wei, L.; Qian, Q.; Harris, A.; Minett, A.; Ramakrishna, S.; Ng, A.; Chen, Y. Textile Energy Storage: Structural Design Concepts, Material Selection and Future Perspectives. Energy Storage Materials 2016, 3, 123-139.

Liu, W.; Chen, Z.; Zhou, G.; Sun, Y.; Lee, H.; Liu, C.; Yao, H.; Bao, Z.; Cui, Y. 3D Porous Sponge-Inspired Electrode for Stretchable Lithium-Ion Batteries. Advanced Materials 2016, 28 (18), 3578-3583.

Sun, Y.; Lopez, J.; Lee, H.; Liu, N.; Zheng, G.; Wu, C.; Sun, J.; Liu, W.; Chung, J.; Bao, Z.; Cui, Y. A Stretchable Graphitic Carbon/Si Anode Enabled by Conformal Coating of a Self-Healing Elastic Polymer. Advanced Materials 2016, 28 (12), 2455-2461.

Balogun, M.-S.; Zeng, Y.; Qiu, W.; Luo, Y.; Onasanya, A.; Olaniyi, T.; Tong, Y. Three-Dimensional Nickel Nitride (Ni3N) Nanosheets: Free Standing and Flexible Electrodes for Lithium Ion Batteries and Supercapacitors. Journal of Materials Chemistry A 2016, 4 (25), 9844-9849.

Shen, L.; Che, Q.; Li, H.; Zhang, X. Mesoporous NiCo2O4 Nanowire Arrays Grown on Carbon Textiles as Binder-Free Flexible Electrodes for Energy Storage. Advanced Functional Materials 2014, 24 (18), 2630-2637.

Jost, K.; Dion, G.; Gogotsi, Y. Textile Energy Storage in Perspective. Journal of Materials Chemistry A 2014, 2 (28), 10776-10787.

Gaikwad, A.; Zamarayeva, A.; Rousseau, J.; Chu, H.; Derin, I.; Steingart, D. Highly Stretchable Alkaline Batteries Based on an Embedded Conductive Fabric. Advanced Materials 2012, 24 (37), 5071-5076.

Wang, C.; Zheng, W.; Yue, Z.; Too, C.; Wallace, G. Buckled, Stretchable Polypyrrole Electrodes for Battery Applications. Advanced Materials 2011, 23 (31), 3580-3584.

Hu, L.; Mantia, F.; Wu, H.; Xie, X.; McDonough, J.; Pasta, M.; Cui, Y. Lithium-Ion Textile Batteries with Large Areal Mass Loading. Advanced Energy Materials 2011, 1 (6), 1012-1017.

Jost, K.; Perez, C.; McDonough, J.; Presser, V.; Heon, M.; Dion, G.; Gogotsi, Y. Carbon Coated Textiles for Flexible Energy Storage. Energy & Environmental Science 2011, 4(12), 5060-5067.

Wu, Y.; Mechael, S.S.; Chen, Y; Carmichael, T.B. Velour fabric as an island-bridge architectural design for stretchable textile-based lithium-ion battery electrodes. ACS Appl. Mater. Interfaces 2020, 12, 46, 51679-51687.

Wu, Y.; Carmichael, T. "CuS/Au-coated velour fabric composite electrodes—A new architecture for stretchable and wearable energy

(56) References Cited

OTHER PUBLICATIONS storage." 2019 MRS Fall Meeting & Exhibit. Materials Research Society. Boston, Massachusetts. Dec. 1, 2019. Poster presentation.

* cited by examiner

TUFTED PILE FABRIC AS FRAMEWORK FOR STRETCHABLE AND WEARABLE COMPOSITE ELECTRODES

RELATED APPLICATIONS

This application claims the benefit under 35 USC 119(e) to U.S. Provisional Application Ser. No. 62/941,987 filed Nov. 29, 2019, the entire contents of which are incorporated herein by reference.

SCOPE OF THE INVENTION

The present invention relates to a modified fabric material operable as a current collector, preferably further as a cathode, an anode or an electroactive material. The present invention also relates to a method for preparing the modified fabric material, as well as use of in the manufacture of a wearable power source.

BACKGROUND OF THE INVENTION

The future of textiles may reside with electronics, with new wearable electronics integrated into "smart clothing" systems that will incorporate input devices such as sensors to detect biometric data and output devices such as light-emitting displays to display data to the user. Powering this next generation of smart clothing to enable the continuous function of these wearable devices is of some importance. At present, heavy and bulky "black box" battery packs that do not meet the demand for comfort and wearability are carried as power sources for wearable electronic devices. The development of lightweight and stretchable energy storage devices that are seamlessly integrated with textiles may provide for an important step in the development of wearables.

The electronic textile (e-textile) community is investigating several potential solutions, including textile-based supercapacitors, energy generators, and solar cells. Lithium-ion batteries (LIBs) are one of the more promising power sources due to relatively high energy density and long cycle life; however, conventional LIB materials may be mechanically incompatible with soft and stretchable textiles. The battery electrode is the core component that largely dictates the mechanical properties of the entire battery. These electrodes consist of a current collector, such as aluminum or copper foil, coated with a brittle electroactive material composite, such as $LiCoO_2$, $LiFePO_4$ or $Li_4Ti_5O_{12}$, mixed with a conductive additive and binder. Each component in this conventional electrode is vulnerable to cracking or delamination in response to mechanical strain during wearing, leading to diminished electrochemical performance. Solving the mechanical mismatch problem between brittle LIB materials and stretchable textiles may thus be an important challenge in the development of robust wearable power sources with stable performance under mechanical deformation.

One leading approach has developed fiber-based LIBs, which can be woven/knitted into textiles using conventional textile manufacturing techniques. The challenge with this approach is breakage of LIB fibers during the manufacturing process if the weavability or knittability of LIB fibers cannot meet the requirements of industrial textile manufacturing. There is also a lack of efficient technologies to interconnect large numbers of electrodes of fiber-shaped devices.

The rapidly developing field of skin-mounted elastomer-based electronics has successfully navigated the mechanical mismatch between rigid and brittle functional materials and soft elastomeric substrates by configuring conventional rigid and brittle materials into mechanics-guided architectures that can stretch. These architectural strain-engineering strategies have successfully converted many types of highly brittle or rigid materials, such as silicon, gallium arsenide, and metals, into stretchable formats. Configuring these materials into thin, wavy structures such as out-of-plane wrinkles or arches, or in-plane serpentines and meshes, enables tensile strain to be accommodated by converting stretching strains into less destructive bending strains of the wavy and curved structures. Metallic wavy structures have also been deployed to electrically connect arrays of rigid conventional electronic devices on stretchable substrates. In these "island-bridge" structures, the metallic "bridges" unbend to absorb the strain with stretching, protecting the rigid "islands" from strain-induced damage and providing stretchability to the entire circuit. These architectural strain-engineering designs have been applied to fabricate stretchable LIBs on elastomeric substrates, reducing the strain concentration and alleviating the detrimental effects of strain on the performance of LIB electrodes. For example, Weng, W. et al., "A Gum-Like Lithium-Ion Battery Based on a Novel Arched Structure". *Adv. Mater.* 2015, 27, 1363-1369 reports fabrication of stretchable LIBs consisting of arched electrodes that unbend with strain, enabling stable electrochemical performance with stretching, whereas Xu et al., "Stretchable Batteries with Self-Similar Serpentine Interconnects and Integrated Wireless Recharging Systems". *Nat. Commun.* 2013, 4, 1543 reports use of conventional LIBs as rigid islands connected by stretchable serpentine metallic interconnects on an elastomeric substrate.

SUMMARY OF THE INVENTION

It is a non-limiting object of the present invention to provide a modified or metallized fabric material or composition preferably operable as an active or cathode material in an electrochemical power source, and which may permit operation without being substantially negatively affected by stretching along the fabric surface.

It is another non-limiting object of the present invention to provide a method for preparing a modified fabric material or composition by direct metal deposition on a fabric material, and which may impart usable electrochemical properties and resistance to capacity degradation over use.

It is another non-limiting object of the present invention to provide use of a modified fabric material or composition in the manufacture of a clothing item integrally incorporating an electrochemical power source for a wearable electronic device, such as a biometric sensor or a display or sound device, and which may permit improved comfort to a user with improved resistance to failure due to, for example, mechanical stress.

In one simplified aspect, the present invention provides a modified fabric material comprising a pile fabric material having a fabric framework and a pile extending substantially normal therefrom, wherein the fabric framework and the pile respectively comprise first and second metallic coatings.

In one aspect, the present invention provides a modified fabric composition, the composition comprising a fabric member and an electroactive member for storing energy, wherein the fabric member comprises a fabric framework defining a deformable plane and a plurality of projections extending at an angle from the plane, and wherein the electroactive member is coupled to at least one of the projections.

In another aspect, the present invention provides use of a modified fabric composition as an electrode, the composition comprising a fabric member, an electroactive member for storing energy, and a conductive coating electrically coupled to the electroactive member for transferring the energy, wherein the fabric member comprises a fabric framework defining a deformable plane and a plurality of projections extending at an angle from the plane, the electroactive member being coupled to at least one of the projections, and the conductive coating being disposed on the fabric framework, and wherein the fabric framework comprises a stretchable fabric framework, and the plurality of projections are coupled to the stretchable fabric framework at a distance from each other, whereby a tensile stress applied to the stretchable fabric framework during stretching is not transmitted to the projections.

In yet another aspect, the present invention provides a method for preparing a modified fabric composition for use as an electrode, the method comprising: providing a fabric member comprising a stretchable fabric framework defining a deformable plane and a plurality of projections coupled to the stretchable fabric framework at a distance from each other and extending at an angle from the plane; depositing a conductive coating on the fabric framework; and depositing an electroactive coating on the projections, wherein the electroactive coating is electrically coupled to the conductive coating.

It is to be appreciated that the fabric material or member is not particularly limited, provided that the fabric material is constructed to include the projections in a manner that does not significantly or directly affect the projections when the fabric framework is stretched. In one embodiment, the fabric framework and the projections are arranged such that a mechanical strain applied to the fabric framework is not directly transmitted to the projections. It is preferable the pile is not on the same plane of the fabric framework, such that during, for example, elongation or stretching of the fabric framework, stress is not transferred or applied to the projections. In a preferred embodiment, the fabric material comprises a pile fabric.

In one embodiment, the fabric framework comprises a stretchable fabric framework, and the plurality of projections are coupled to the stretchable fabric framework at a distance from each other, whereby a tensile stress applied to the stretchable fabric framework during stretching is not transmitted to the projections.

In one embodiment, the fabric framework is produced by weft knitting or warp knitting. In one embodiment, the fabric material or member comprises a filling-pile fabric or a warp-pile fabric, and the projections comprising a pile selected from the group consisting of a loop pile, an uncut pile, a cut pile, a knotted pile, a tufted pile, a woven pile, a cord pile or a twist pile. In one embodiment, the warp-pile fabric or the fabric framework includes a tricot-knitted fabric, a Milanese-knitted fabric, a Raschel-knitted fabric, a jersey-knitted fabric or a stitch bonded fabric. In one embodiment, the fabric material or member comprises terrycloth, velvet, velveteen, velour, corduroy, chenille, plush or a combination thereof.

In one embodiment, the fabric material or member comprises a warp-knitted velour fabric comprising as the fabric framework a warp-knitted fabric framework and a cut pile as the projections. In one embodiment, the warp-knitted fabric framework has a wale direction and a course direction, and the warp-knitted fabric framework has a greater elastic stretchability in the wale direction compared to the course direction. In one embodiment, each of the fabric framework and the projections are formed with one or more of a polyester yarn and a spandex yarn. It is to be appreciated, however, that the fabric framework and the projections are not strictly restricted to be formed with a polyester or spandex yarn, and may be formed with other materials, including those known in the relevant arts and/or commercially available. In one embodiment, the other materials comprise cotton, nylon, acrylic, acetate, polyurethanes, rayon, silk, viscose, olefin, wool, jute, hemp or a combination thereof.

It has been appreciated that the modified or metallized fabric material or composition of the present invention may incorporate features to permit operation as, for example, an electrode in the formation of an electrochemical power source, such as a battery or a lithium-ion battery. To that end, it has been recognized that the projections extending from the base fabric framework may incorporate a conductive, cathode or anode component or an electroactive member for such operation. In one embodiment, the electroactive member is coupled to the projections. In one embodiment, the electroactive member comprises an electroactive coating disposed on the projections.

In one embodiment, the composition is for use as an electrode, preferably an electrode of an electrochemical power source, such as, but not limited to a lithium-ion battery. In one embodiment, the electrode is a cathode. It is to be appreciated that the composition is not strictly restricted for use as an electrode, and may permit other uses, depending on the electroactive member or the conductive member. By way of a non-limiting example, the composition is for electrochemical sensing of a molecule or a biomolecule. In one embodiment, the molecule or the biomolecule comprises glucose, cortisol, a toxic gas, an explosive gas, $H_2$, CO, HCHO, an electrolyte, a metabolite, an amino acid, a protein or a hormone, the hormone preferably being contained in a sweat. In one embodiment, the electroactive member comprises copper sulfide of the formula CuS, and the composition is for detecting the biomolecule, the biomolecule comprising glucose.

In one embodiment, the electroactive member comprises an electroactive coating disposed on the projections, the electroactive coating comprising graphite, graphene, a metal oxide, a metal sulfide, a metal selenide, a metal phosphate, a metal phosphide, a conjugated polymer or a conductive or electroactive composite thereof. It is to be appreciated that the metal is not particularly limited, provided the metal facilitates in operation as the electroactive coating. In one embodiment, the metal comprises silver, copper, gold, aluminum, calcium, beryllium, rhodium, magnesium, molybdenum, manganese, iridium, tungsten, zinc, cobalt, cadmium, nickel, ruthenium, lithium, iron, platinum, palladium or tin. It is to be appreciated that the electroactive coating is not particularly limited, provided that the coating may operate as an electrode, a cathode or anode, or store energy, chemical energy or electrochemical energy. In one embodiment, the electroactive coating comprises cobalt oxide, iron phosphate, manganese oxide, nickel manganese cobalt oxide, nickel cobalt aluminum oxide, lithium titanate, hard carbon, tin/cobalt alloy or silicon/carbon.

In one embodiment, the composition further comprises a conductive member coupled to the fabric framework, the conductive member being electrically coupled to the electroactive member for transferring the energy, wherein the conductive member comprises silver, copper, gold, aluminum, calcium, beryllium, rhodium, magnesium, molybdenum, iridium, tungsten, zinc, cobalt, cadmium, nickel, ruthenium, lithium, iron, platinum, palladium or tin. In one embodiment, the conductive member comprises a conductive coating disposed on the fabric framework. In one embodiment, the conductive coating comprises gold, and the electroactive member comprises copper sulfide. In one embodiment, said copper sulfide has the formula CuS, and optionally wherein said CuS comprises a nanograin structure having a hexagonal phase.

In one embodiment, the fabric framework is operable as a current collector, and the projections are operable as an electroactive material, an electrode, a cathode or an anode. It is to be appreciated that the electroactive material or member is not strictly limited to copper sulfide, and may include other electroactive materials, including, but not limited to, metal sulfides, selenides, oxides, phosphates or phosphides.

In one embodiment, the fabric framework comprises opposing first and second fabric surfaces along the deformable plane, the projections extending from the first fabric surface, and the conductive coating being disposed on the second fabric surface.

In one embodiment, the projections are between about 0.1 and 5 mm in length, the angle is between about 5° and about 90° relative to the plane, and a loading density of the electroactive member is between about 0.1 and 10 mg/cm$^2$ relative to a unit area of the fabric framework.

In one embodiment, said depositing the conductive coating comprises conducting an electroless nickel immersion gold (ENIG) to thereby deposit gold on the fabric framework.

In one embodiment, said depositing the electroactive coating comprises conducting an electroless copper deposition on the projections, followed by solution sulfurization, to thereby deposit copper sulfide on the projections.

In one embodiment, the fabric framework comprises opposing first and second fabric surfaces along the deformable plane, the projections extending from the first fabric surface, and wherein said conducting the ENIG is selected to deposit the gold on the fabric framework and the projections, and said conducting the electroless copper deposition and the solution sulfurization is selected to deposit copper sulfide on the projections and maintain the gold on the second fabric surface.

In one embodiment, the method further comprises blocking the second fabric surface prior to said conducting the electroless copper deposition, wherein said conducting the electroless copper deposition is catalyzed by the gold deposited on the projections, and said conducting the solution sulfurization comprises immersing the fabric member in a solution comprising elemental sulfur and carbon disulfide. In one embodiment, the solution further comprises ethanol, hexane or dimethylformamide.

In yet another aspect, the present invention provides a method for preparing a modified fabric material comprising a fabric framework, a plurality of projections oriented substantially normal to the framework, and first and second conductive coatings, the first coating being disposed on the fabric framework, and the second coating being disposed on the projections, wherein the method comprises depositing the first coating on the fabric framework and depositing the second coating on the projections.

In one embodiment, the first and second coatings respectively comprise first and second conductive metals each comprising one or more of silver, copper, gold, aluminum, calcium, beryllium, rhodium, magnesium, molybdenum, iridium, tungsten, zinc, cobalt, cadmium, nickel, ruthenium, lithium, iron, platinum, palladium and tin, wherein the first coating is different from the second coating.

In one embodiment, said depositing the first coating comprises electroless deposition of the first conductive metal on the fabric framework and the projections, and said depositing the second coating comprises electroless deposition of the second conductive metal on the projections, said first conductive metal being operable as a catalyst in said electroless deposition of the second conductive metal.

In one embodiment, the first conductive metal comprises gold, and the second conductive metal comprises copper, and the method further comprises contacting the second conductive metal with a solution of elemental sulfur in carbon disulfide, whereby the second coating is formed as copper sulfide. In one embodiment, said depositing the first conductive coating comprises electroless nickel immersion gold, and said depositing the second conductive coating comprises immersing the projections in an electroless copper bath.

In yet another aspect, the present invention provides use of the modified fabric material in the manufacture of an electrochemical power source, wherein the fabric framework is for forming a current collector, and the projections are for forming a cathode.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
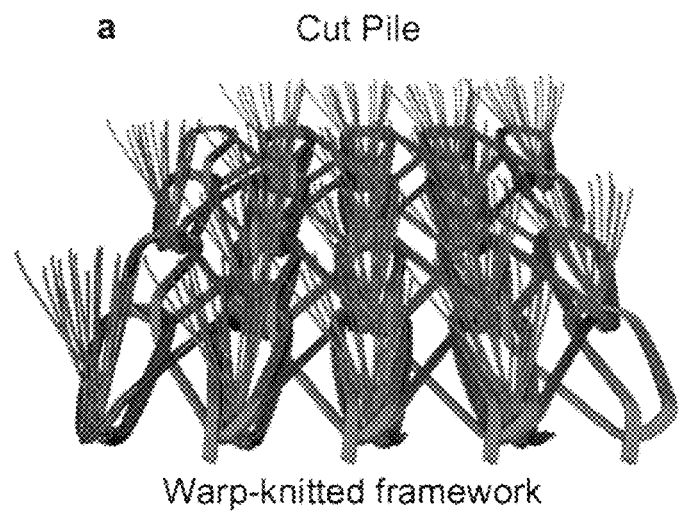
FIG. 1 shows a magnified perspective view of a warp-knitted velour fabric for preparing a fabric electrode in accordance with a preferred embodiment of the present invention, and which shows structure of the warp-knitted velour fabric.

The advancement of wearable electronics may benefit from seamless integration of lightweight and stretchable energy storage devices with textiles. Integrating brittle energy storage materials with soft and stretchable textiles, however, has presented a challenging mechanical mismatch. It may be desirable to protect brittle energy storage materials from strain-induced damage, and at the same time preserve the softness and stretchability of a functionalized e-textile.

It has been appreciated that the strain-engineering architectures developed for elastomer-based electronics do not translate directly to the non-planar, porous, 3D structures of textiles; however, the structures of textiles themselves may include built-in mechanical designs that enable stretchability, softness, and drapability of the fabric. For example, the interlaced yarn loops in knitted textiles can be thought of as wavy serpentines that unbend with stretching. Other textile architectures may include woven, braided and tufted designs, which may provide for architectural strain-engineering approaches for integrating brittle functional materials with soft textiles, and for addressing a mechanical mismatch problem. Although the softness and stretchability of knitted textiles makes them a more suitable choice for wearable electronics, the integration of functional LIB materials with knitted structures has proven to be difficult. For example, Ghadi et al. "Stretchable Fabric-Based $LiCoO_2$ Electrode for Lithium Ion Batteries". *Extreme Mech. Lett.* 2019, 32, 100532 reported LIB electrodes by casting a $LiCoO_2$ slurry onto a stretchable knitted silver fabric. The slurry filled in the fabric voids, stiffening the fabric and rendering the composite vulnerable to cracking. The electrochemical performance of the electrode under strain was not reported.

Here, we present a textile-based architectural strain-engineering approach to integrate brittle LIB materials with knitted textiles, forming a stretchable textile-based LIB electrode that protects brittle LIB materials from strain.

In particular, we describe use of a warp-knitted velour fabric in an "island-bridge" architectural strain-engineering design to prepare stretchable textile-based lithium ion battery (LIB) electrodes. The velour fabric preferably includes a warp-knitted framework and a cut pile. An LIB electrode is integrated into the fabric by solution-based metallization to create warp-knitted framework current collector "bridges", followed by selective deposition of the brittle electroactive material CuS on cut pile "islands". As the textile electrode is stretched, the warp-knitted framework current collector elongates, while the electroactive cut pile fibers simply ride along at their anchor points on the framework, protecting the brittle CuS coating from strain and subsequent damage.

The textile-based stretchable LIB electrode exhibited improved electrical and electrochemical performance with a current collector sheet resistance of 0.85±0.06 Ω/sq and a specific capacity of 400 mAh/g at 0.5 C for 300 charging-discharging cycles, as well as outstanding rate capability. The electrical performance and charge-discharge cycling stability of the electrode persisted even after 1000 repetitive stretching-releasing cycles, demonstrating the protective functionality of the textile-based island-bridge architectural strain-engineering design.

Figure 2:
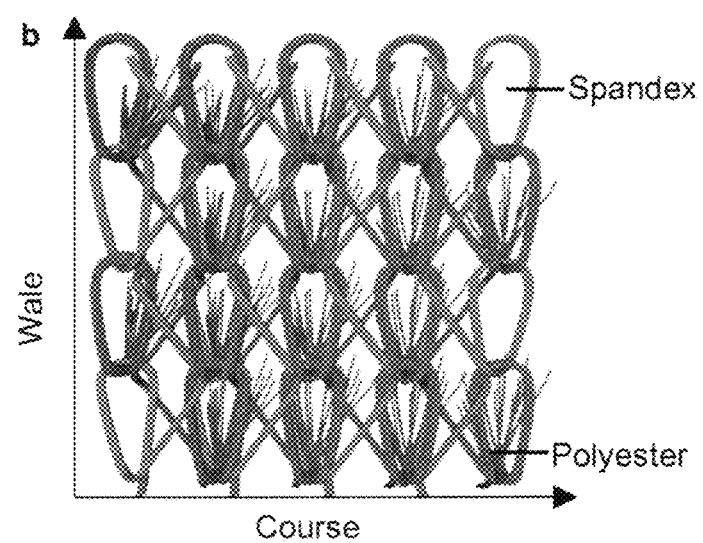
FIG. 2 shows a bottom view of the warp-knitted velour fabric shown in FIG. 1.
Figure 3:
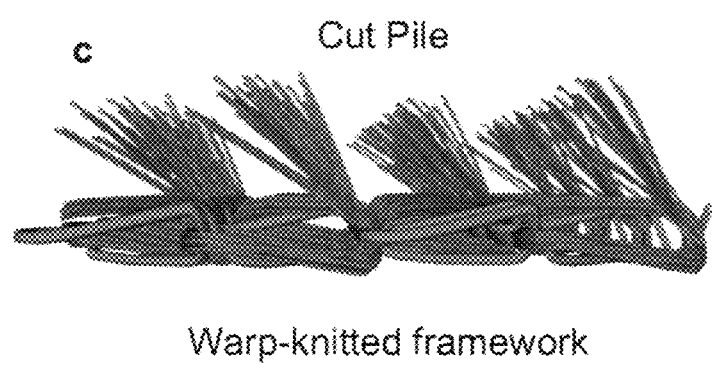
FIG. 3 shows a lateral view of the warp-knitted velour fabric shown in FIG. 1.
Figure 8:
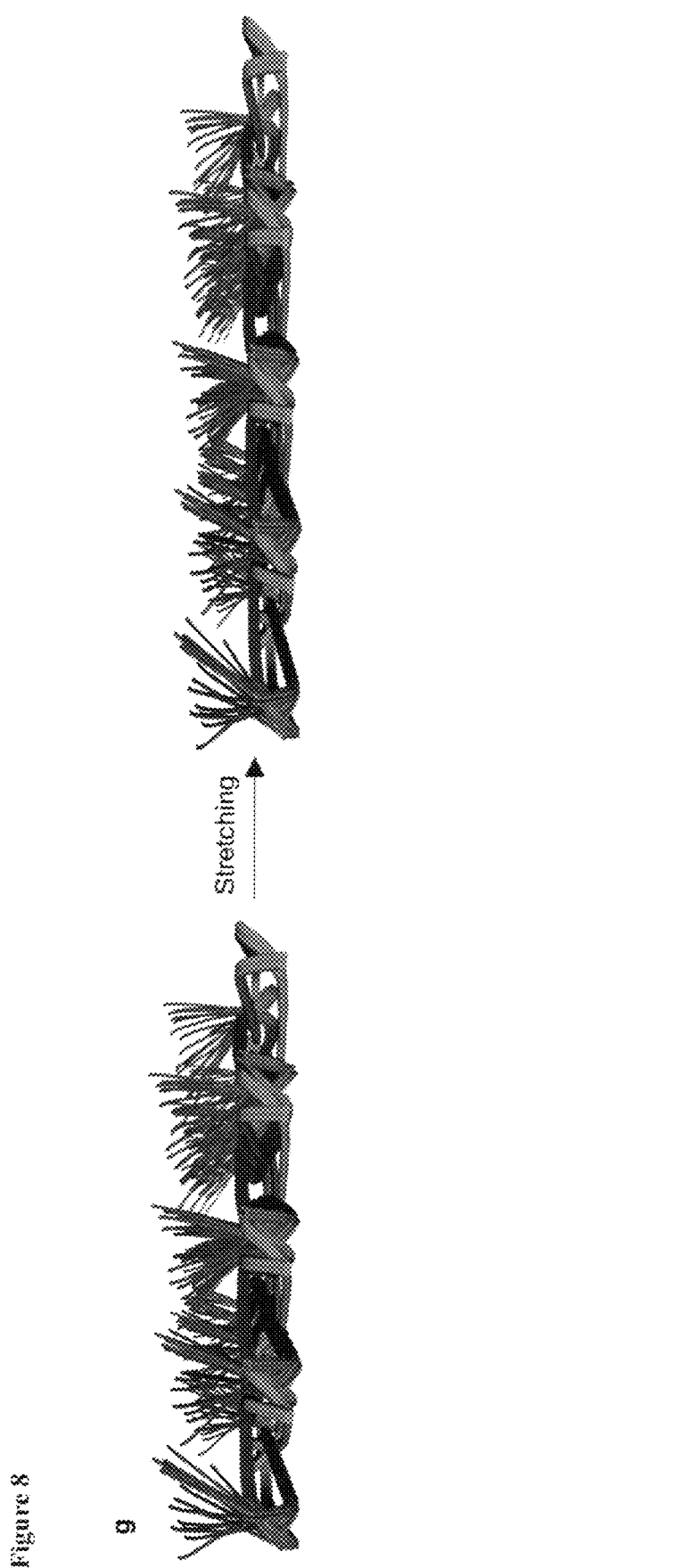
FIG. 8 shows, on the left, a lateral view of the warp-knitted velour fabric shown in FIG. 1 in a non-stretched condition, and on the right, a lateral view of the fabric stretched in the course direction.

As noted above, the architectural features of a warp-knitted velour textile were used as the basis for an island-bridge architectural strain engineering strategy to fabricate a stretchable LIB electrode. The velour fabric includes a warp-knitted framework and a cut pile, as seen in FIGS. 1 to 3. As the textile is stretched, the warp-knitted framework elongates but the cut pile fibers protruding from the framework move horizontally and separate, as seen in FIG. 8. In its mechanical response to stretching, this velour fabric architecture is similar to island-bridge structures: the looped yarns comprising the warp-knitted framework act as "bridges" and unbend with strain, while the cut pile fibers—the "islands"—are not subjected to the strain. By metallizing the warp-knitted velour fabric with gold and then selectively depositing the brittle electroactive material CuS on the cut pile, we integrate the LIB electrode into a single piece of velour fabric, while protecting the brittle CuS from strain and subsequent damage. As noted above, the electrode exhibited a specific capacity of ~400 mAh/g at 0.5 C with no obvious sign of capacity decay for at least 300 cycles. Furthermore, after undergoing 1000 stretching-releasing cycles, the electrode exhibited stable electrochemical performance, showing application of this architectural strain-engineering approach to textile-based stretchable LIBs.

Furthermore, it has been appreciated that to achieve higher energy storage for stretchable batteries, copper sulfide is one of the more promising cathode materials for LIBs because of its high theoretical capacity 560 mAhg$^{-1}$, flat discharge curves and good conductivity. Besides, CuS is environmentally friendly and elementally abundant in earth.

To fabricate the stretchable electrode utilizing CuS as active materials, rather than relying elastomeric materials to improve its mechanical properties, here we report a new approach that uses textile structures to protect the active materials from strain and subsequent damage. We use a warp-knitted velour fabric structure, which includes a warp-knitted framework and a cut pile (see FIG. 1). Metallizing the fabric using solution-based electroless nickel-immersion gold plating renders it conductive, preparing it for use as a current collector. We then electrolessly deposit copper selectively on the cut pile fibers and convert the resulting copper film into CuS by reaction with elemental sulfur. This unique preparation method integrates the active material and the current collector into a single piece of velour fabric in a way that protects the CuS from strain when the fabric electrode is elongated.

The CuS/Au-coated velour fabric electrode showed stable conductivity to 130% strain, and the conductivity also remains stable through 1000 cycles of 50% strain. We show its potential application in LIBs. The electrode exhibited a specific capacity of ~400 mAh/g at 0.5 C with no obvious sign of capacity decay for at least 300 cycles. After undergoing 1000 stretching cycles, the electrode still exhibited stable electrochemical performance.

Experimental Section

Materials: Velour fabric was purchased from local textile store (Fabricland) in the province of Ontario, Canada. APTES, $NiSO_4.6H_2O$, $Na_4P_2O_7.10H_2O$, $CuSO_4.5H_2O$, $KNaC_4H_4O_6.4H_2O$, 37.2% HCHO, and dimethylamine borane were purchased from Sigma Aldrich. All chemicals were used as received. Immersion gold plating solution Gobright TAM-55 was purchased from Uyemura and used as directed by the manufacturer.

Preparation of Gold-coated Velour Fabric: Velour fabric or velour polyester fabric was sonicated in deionized water and isopropyl alcohol for 15 min each, and then exposed to air plasma (preferably at a flow rate of 15 psi) for 10 min. The cleaned fabric was immersed in a 1% v/v solution of APTES in deionized water for 30 min, a Pd/Sn solution (prepared from Cataposit 44 and Cataprep 404 (Shipley) as directed by manufacturer) for 2 min, and aqueous 1 M NaOH for 1 min. Samples were rinsed with water in between steps. The fabric was then metallized in nickel ELD bath (0.08 M $NiSO_4.6H_2O$, 0.14 M $Na_4P_2O_7.10H_2O$ and 0.07 M dimethylamine borane in water) for 10 min with sonication. After rinsing with water, the Ni-coated fabric was immersed in the immersion Au solution or Au ELD bath (Gobright TAM-55, Uyemura) for 40 min.

Deposition and Patterning of CuS on Velour Fabric: Kapton tape was used as the mask to selectively block copper deposition. The gold-coated velour fabric was immersed in the copper ELD bath for 60 min which contains a 10:1 v:v mixture of freshly prepared solution A and B. Solution A consisted of 4.5 g $L^{-1}$ $CuSO_4.5H_2O$, 6.0 g $L^{-1}$ NaOH, and 21.0 g $L^{-1}$ $KNaC_4H_4O_6.4H_2O$. Solution B was 37.2% HCHO in distilled water. The Au-coated velour fabric with Cu/Au-coated velour fabric cut pile was then immersed in 100 mg/mL sulfur in carbon disulfide solution for 4 h at room temperature in ambient conditions to convert Cu to CuS. The fabricated velour fabric electrode was dried in vacuum oven at 70° C. overnight.

Electrochemical Measurements: The electrochemical properties of the velour fabric LIB electrode was tested in standard CR2032 coin cells that were assembled in an Ar-filled glovebox by directly using the velour fabric LIB electrode as the working electrode, a lithium foil as the counter electrode, Celgard 2400 film as the separator and 1 M lithium bis(trifluoromethane sulfonamide) (LiTFSI) in 1:1 v/v 1,3-dioxolane (DOL)/1,2-dimethoxyethane (DME) as the electrolyte. The cells were galvanostatically cycled between 1.3-2.6 V using a LAND battery testing system (CT2001A). Cyclic voltammograms were taken on an electrochemical workstation (Bio-logic) at a scan rate of 0.1 mV/s. All the reported potential values are given versus $Li^0/Li^+$ and the rate is calculated by supposing the whole active material being reduced during the first charge.

Characterization: Optical microscopy was performed using an Olympus BX51 microscope equipped with an Olympus Q-Color3 digital camera. SEM images and EDX were taken on an FEI Quanta 200 Environmental SEM. XRD measurement was run on a PROTO AXRD powder diffractometer equipped with a Cu X-ray source, and a Mythen 1K silicon strip detector, operated at 30 kV and 20 mA. Scans were performed utilizing CuKα radiation, a 2 mm divergence slit, and a step size of 0.02 degrees 2 theta. X-ray diffraction patterns were obtained in the 2θ region from 25 to 80°. For electrical characterization under strain, samples were clamped in the micro-vice stretcher (S. T. Japan, USA, Inc.) and stretched manually in 5% increments while measuring the resistance using a Keithley 2601A Sourcemeter. A home-made auto-stretching stage was used for the cyclic stretching test.

Results and Discussion

Velour Fabric Structure and Stretching Mechanism

Figure 4:
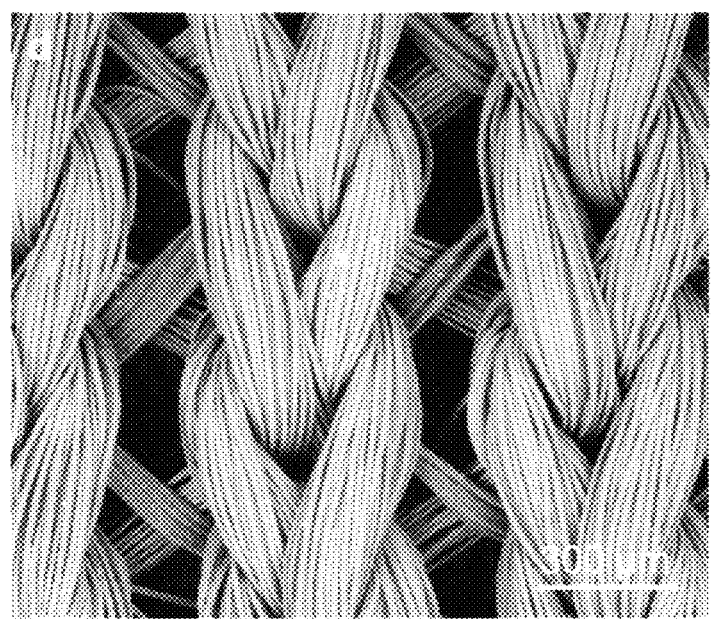
FIG. 4 shows an image of the bottom view of the warp-knitted velour fabric shown in FIG. 1, and which is generated by a scanning electron microscope.
Figure 5:
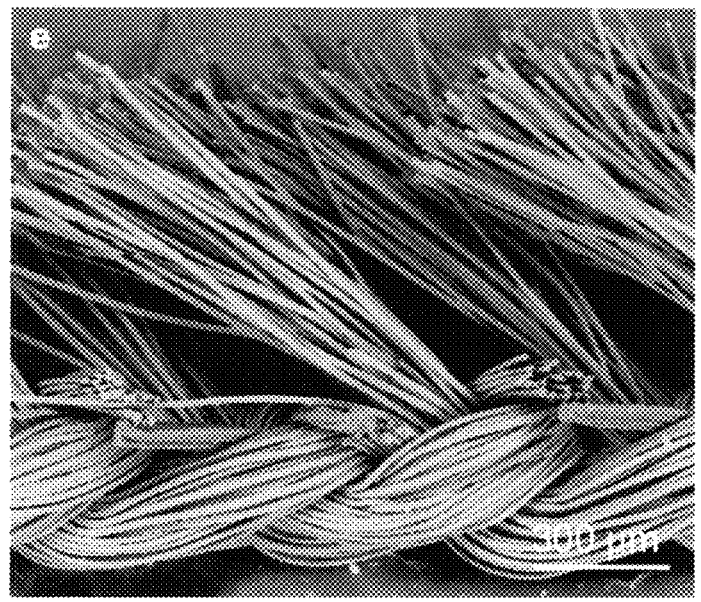
FIG. 5 shows an image of the lateral view of the warp-knitted velour fabric shown in FIG. 1, and which is generated by a scanning electron microscope.
Figure 26:
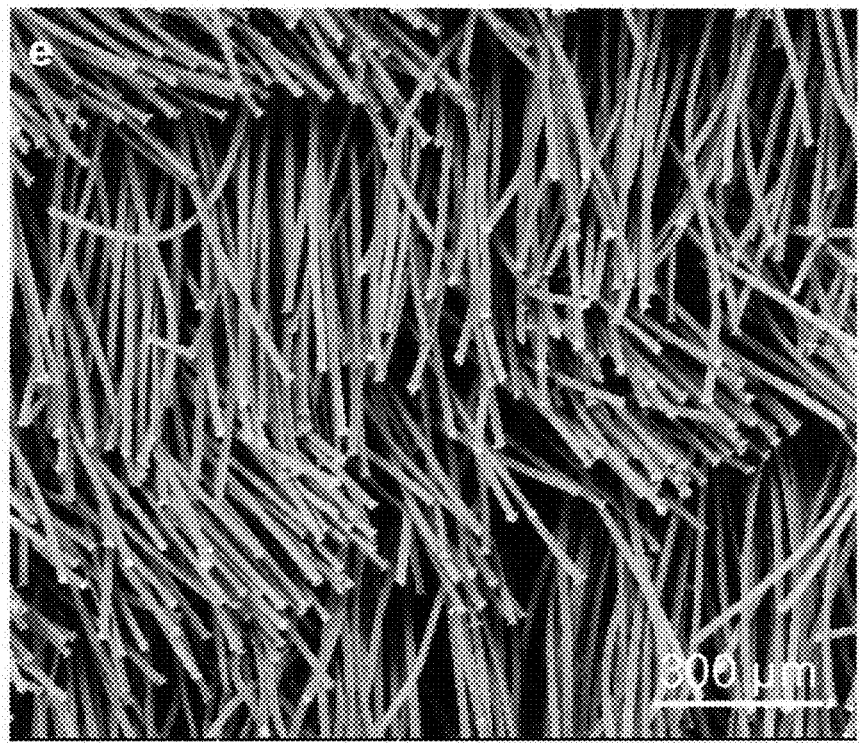
FIG. 26 shows an image of the front side of the warp-knitted velour fabric shown in FIG. 1, and which is generated by a scanning electron microscope.

The warp-knitted velour fabric we used is composed of a warp-knitted framework/trellis and a cut pile, as seen in FIG. 1. The framework is formed of polyester yarns and spandex yarns which are warp-knitted together by doing their overlap in opposite direction, as seen in FIGS. 2 and 4. In other words, the warp-knitted velour fabric consists of polyester and spandex yarns knitted together to provide a framework for the cut pile. The cut piles are polyester fibers which are woven through and protrude from the warp-knitted framework, as seen in FIGS. 3, 5 and 26. The length of the cut pile protruding from the warp-knitted framework is about 1 mm with an angle of natural inclination of ~30°, as can be seen in FIG. 5.

Figure 6:
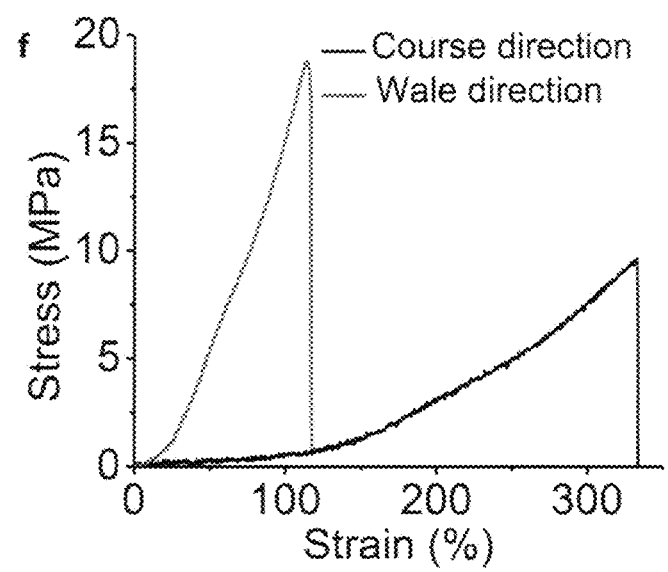
FIG. 6 shows a line graph providing stress-strain curves of the warp-knitted velour fabric shown in FIG. 1 in the wale and course directions.

The warp-knitted structure of the framework provides stretchability to the fabric by unbending of the curved polyester yarns with strain. The presence of the intrinsically stretchable spandex fibers provides resilience, enabling the fabric to return to its original shape after stretching. As seen in FIG. 6, tensile testing of the fabric shows that the elastic stretchability in the wale direction is only ~10%, at which point the loops of the framework became interlocked, a seen in FIG. 7. In contrast, the elastic stretchability in the course direction is ~130%, as seen in FIG. 6. This difference is due to the anisotropic structure of the warp-knitted framework.

Figure 7:
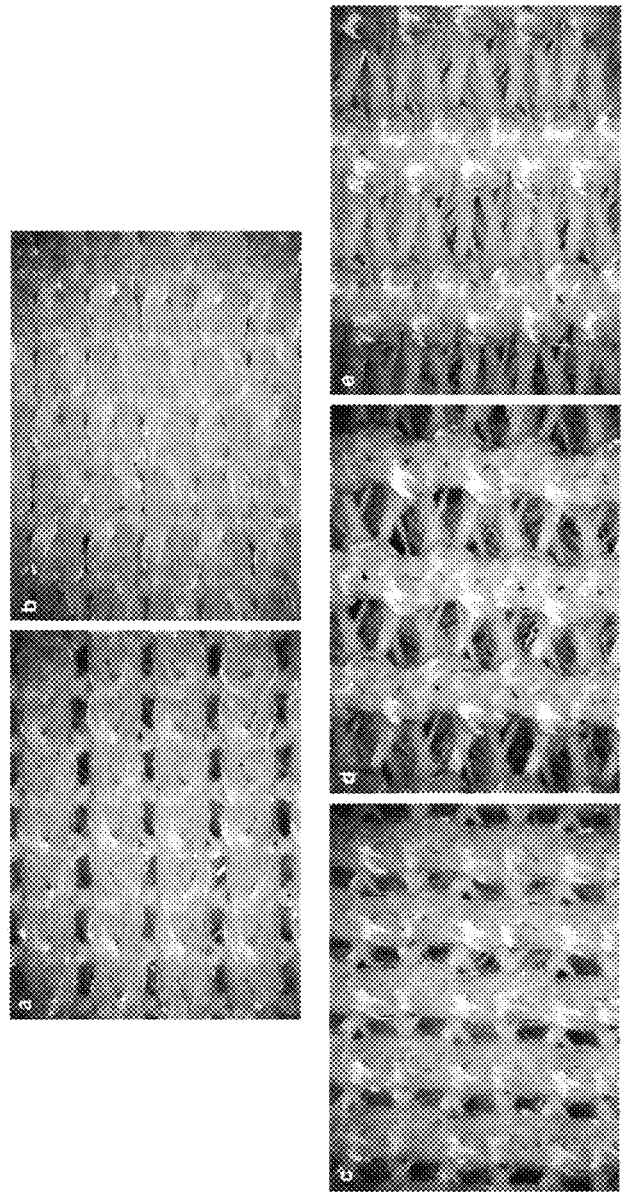
FIG. 7 shows five (5) optical microscope images of the warp-knitted velour fabric shown in FIG. 1, with the top two (2) images showing the fabric at 0% (left) and 10% (right) strain the wale direction, and the bottom (3) images showing the fabric at 0% (left), 50% (middle) and 100% (right) strain in the course direction.

When the fabric is stretched, the loops move and slip to accommodate the strain, eventually becoming interlocked. FIG. 7 show the optical images of fabrics under strain in both directions.

During elongation, the vertical cut pile fibers protruding from the warp-knitted framework move horizontally and are not subjected from the strain, as seen in FIG. 8.

Active Material Deposition Process

Figure 9:
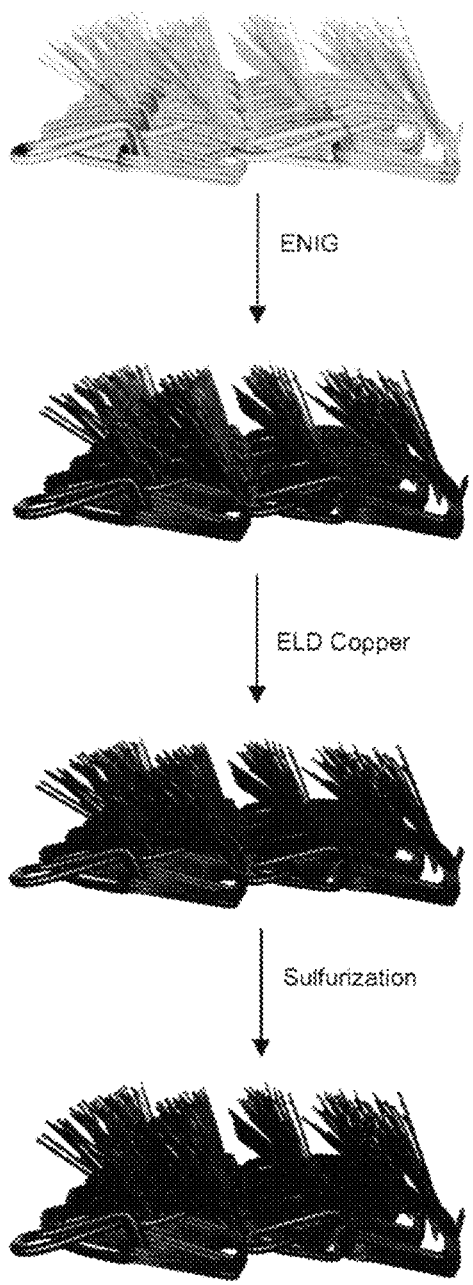
FIG. 9 shows four (4) lateral views of the warp-knitted velour fabric shown in FIG. 1 in a fabrication process to obtain a CuS/Au-coated fabric electrode, with the first view, from the top, showing the fabric before any treatment ("uncoated velour fabric"), the second view after being subject to electroless nickel immersion gold (ENIG) ("Au-coated velour fabric"), the third view after electroless copper deposition ("Cu/Au-coated velour fabric"), and the fourth view after sulfurization ("CuS/Au-coated velour fabric")

We used the warp-knitted velour fabric as an island-bridge architectural design to fabricate stretchable electrochemically active electrodes for use in LIBs by first metallizing the fabric to create the current collector, and then selectively depositing the brittle electroactive material, CuS, only on the cut pile surfaces, as seen in FIG. 9.

In the initial step, we used solution-based electroless nickel-immersion gold (ENIG) metallization (see Wu, Y. et al. Stretchable Ultrasheer Fabrics as Semitransparent Electrodes for Wearable Light-Emitting E-Textiles with Changeable Display Patterns. *Matter* 2020, 2, 882-895; Wu, Y. et al. Solution Deposition of Conformal Gold Coatings on Knitted Fabric for E-Textiles and Electroluminescent Clothing. *Adv. Mater. Technol.* 2018, 3, 1700292; Chen, Y. et al. Heterogeneous Surface Orientation of Solution-Deposited Gold Films Enables Retention of Conductivity with High Strain-A New Strategy for Stretchable Electronics. *Chem. Mater.* 2019, 31, 1920-1927; and Liu, H. et al. Gold Immersion Deposition on Electroless Nickel Substrates Deposition Process and Influence Factor Analysis. *J. Electrochem. Soc.* 2007, 154, D662-D668, the entire contents of which are incorporated herein by reference) to deposit a gold coating conformally over the surfaces of both the warp-knitted framework and the cut pile of the velour fabric.

The ENIG process includes four steps: activation of the velour fabric surfaces, catalyst binding, electroless nickel deposition, and galvanic displacement of nickel for gold. Activation of the velour fabric uses oxidation in an air plasma to produce hydroxyl groups on the surface, followed by chemisorption of 3-aminopropyltriethoxysilane (APTES) to form an amine-terminated surface. Catalyst binding occurs by immersion in an acidic solution of a palladium-tin (Pd/Sn) colloidal catalyst, which consists of a palladium-rich core protected from oxidation by a hydrolyzed $Sn^{2+}$/$Sn^{4+}$ shell with an associated chloride layer that gives the colloids a negatively charged surface (see Osaka, T. et al. A Study on Activation and Acceleration by Mixed $PdCl_2$—$SnCl_2$ Catalysts for Electroless Metal-Deposition. *J. Electrochem. Soc.* 1980, 127, 1021-1029, the entire contents of which are incorporated herein by reference). The acidic Pd/Sn solution protonates the amine groups on the surface of the velour fabric to form an ammonium-terminated surface, enabling electrostatic adsorption of the Pd/Sn colloids (see Miller, M. S. et al. Fabrication of Elastomeric Wires by Selective Electroless Metallization of Poly(Dimethylsiloxane). *Adv. Mater.* 2008, 20, 59-64, the entire contents of which are incorporated herein by reference).

Figure 10:
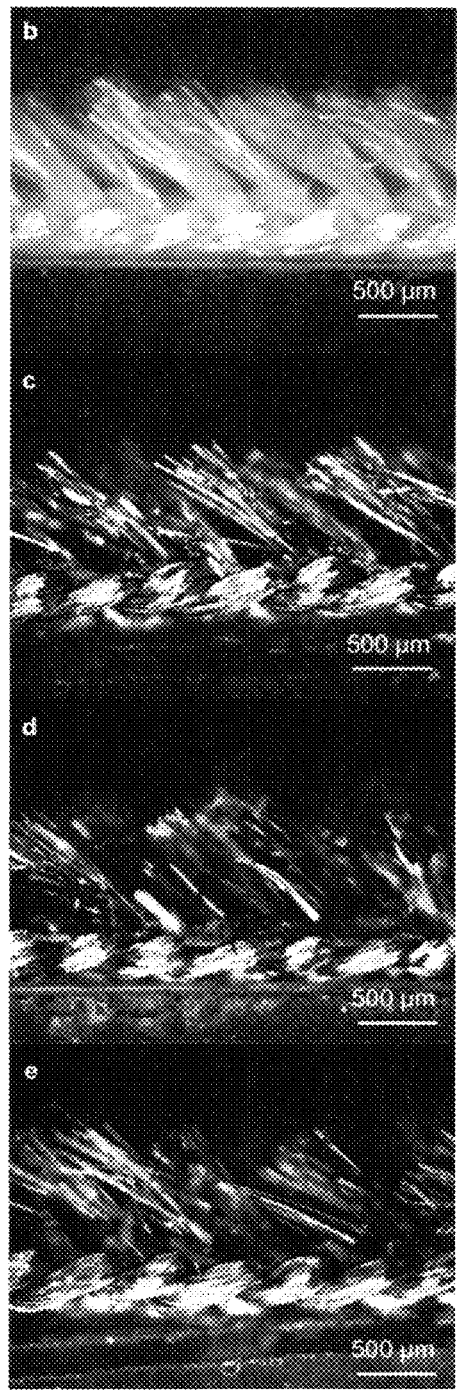
FIG. 10 shows four (4) optical microscope images of the warp-knitted velour fabric shown in FIG. 1, and which correspond to the lateral views shown in FIG. 9, with the first to fourth images, from the top, respectively corresponding to the first to fourth views, from the top, shown in FIG. 9.

Subsequent etching of the Sn shell in 1 M NaOH exposes the Pd core, which initiates the deposition of a nickel coating in an electroless plating solution, followed by autocatalytic deposition of a nickel coating using a dimethylamine borane reducing agent in the electroless nickel solution. Finally, immersing the nickel-coated velour fabric in a solution of potassium gold cyanide results in molecular exchange of nickel for gold. In this galvanic displacement reaction, Ni atoms in the film reduce $Au^+$ ions from solution, releasing $Ni^{2+}$ ions into the solution. The aqueous solutions used in the ENIG process permeate the velour fabric to deposit gold on the surfaces of both the warp-knitted framework and the cut pile, changing the color of the velour fabric from white to golden, as seen in FIG. 10 (the images labeled "b" and "c") and rendering it conductive with a sheet resistance of 0.77±0.04 Ω/sq.

We then deposited the electroactive material, CuS, selectively on the cut pile surfaces using electroless copper deposition and solution sulfurization. We applied Kapton tape to the backside of the velour fabric to prevent deposition on this side of the Au-coated framework current collector. We first deposited a copper coating selectively onto the Au-coated cut pile fibers using an electroless copper plating solution, as seen in FIG. 10 (the image labeled "d"). Since gold is catalytic to electroless copper deposition (see Baum, T. H. Photochemically Generated Gold Catalyst for Selective Electroless Plating of Copper. *J. Electrochem. Soc.* 1990, 137, 252-255, the entire contents of which are incorporated herein by reference), the copper film could be deposited directly onto the Au-coated cut pile fibers without additional activation or catalyst binding steps. A minor amount of copper deposited on the top side of the current collector, while the back side remained unchanged due to the Kapton tape.

Figure 27:
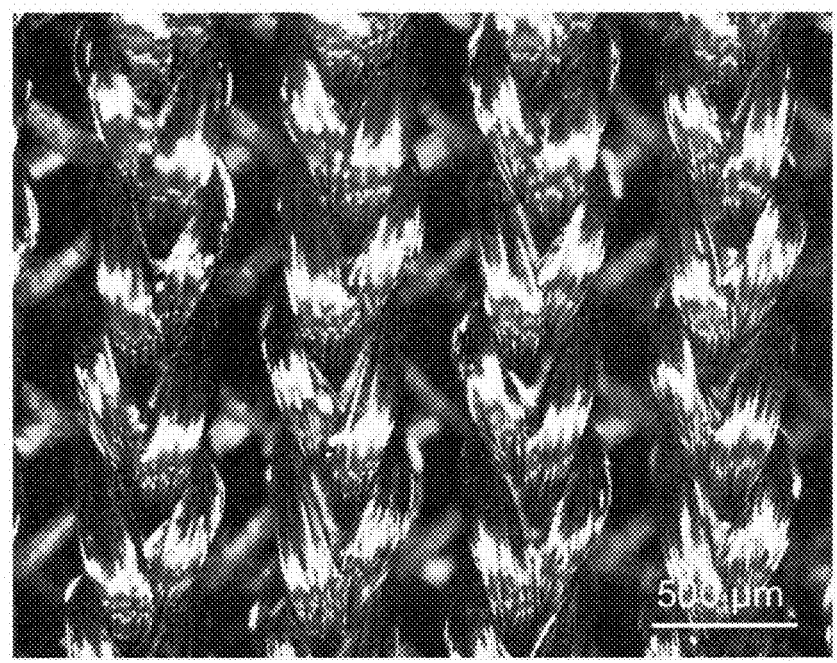
FIG. 27 shows an optical microscope image of the backside of the velour fabric LIB electrode after removal of the Kapton tape mask.

Subsequently immersing the velour fabric in a solution of elemental sulfur in carbon disulfide at room temperature forms a CuS coating on the cut pile surfaces (see Lei, Y. et al. A Very Facile, Low Temperature, One-Step Route to In Situ Fabricate Copper Sulfide Nanosheet Thin Films. *CrystEngComm* 2011, 13, 6212-6217, the entire contents of which are incorporated herein by reference), completing the fabrication of the velour fabric LIB electrode with a CuS loading density of ~1 mg/cm². The distinct black color of the cut pile after this step is consistent with the conversion of Cu into CuS, as seen in FIG. 10 (the image labeled "e"), while the color of the backside of the Au-coated framework current collector remained unchanged since gold is inactive to sulfur, as seen in FIG. 27.

Characterization (Morphology, Structure, Composition)

Figure 11:
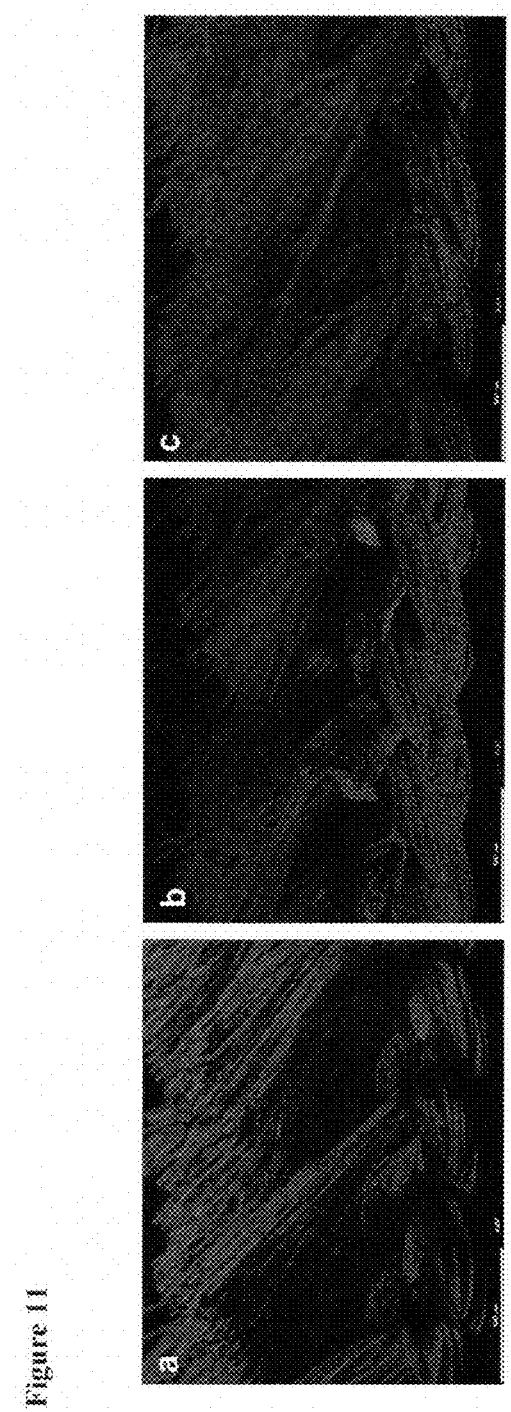
FIG. 11 shows three (3) energy-dispersive X-ray spectroscopy (EDX) mapping or images of Au, Cu and S on the warp-knitted velour fabric shown in FIG. 1, as well as in FIG. 9 as the Au-coated, Cu/Au-coated and CuS/Au-coated velour fabrics, from left to right, where the colors yellow, blue and purple respectively represent Au, Cu and S.

As seen in FIG. 11, we used energy-dispersive X-ray spectroscopy (EDX) of Au, Cu, and S to validate the sequential and selective deposition of Au (image "a"), Cu (image "b") and CuS (image "c") on the cut pile of the velour fabric LIB electrode. These images also confirm that the Au-coated framework current collector remains chemically unchanged after the electroless deposition of copper on the cut pile and subsequent reaction with sulfur. The Au-coated framework current collector furthermore maintained high electrical conductivity after these processes with a sheet resistance of 0.85±0.06 Ω/sq, similar to that of the initial Au-coated velour fabric (0.77±0.04 Ω/sq). We hypothesize that the slight increase in sheet resistance may be attributed to CuS deposition on the top side of the gold-coated current collector (as may be seen in FIG. 10, image "e" and FIG. 11, image "c").

Figure 12:
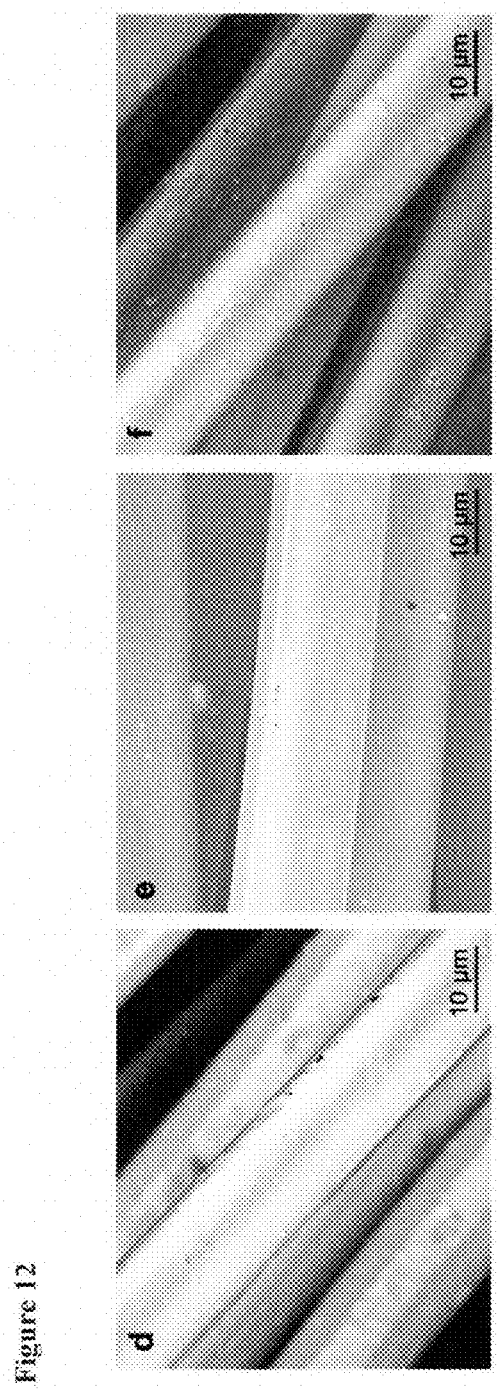
FIG. 12 shows three (3) scanning electron microscope (SEM) images of, from left to right, the Au-coated, Cu/Au-coated and CuS/Au-coated velour fabrics.
Figure 13:
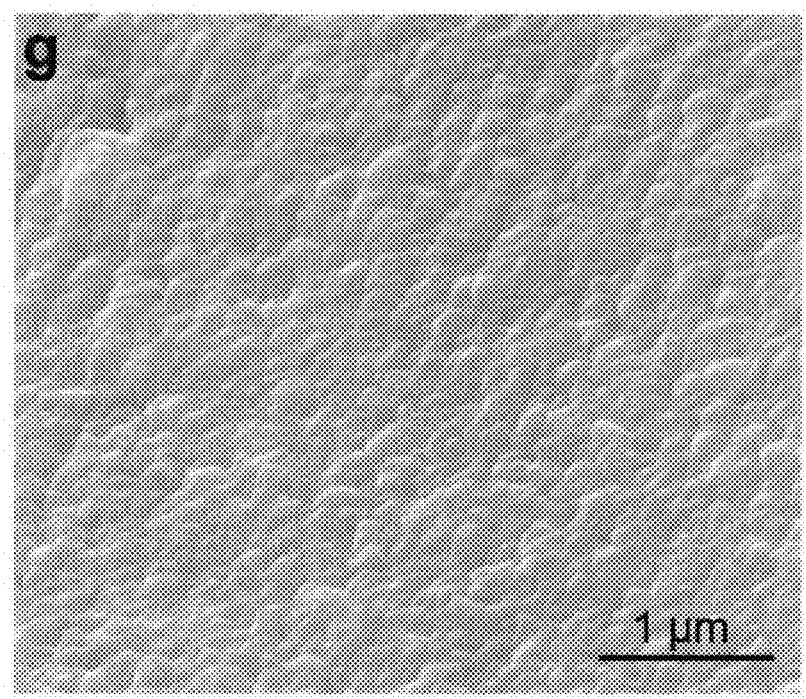
FIG. 13 shows a high magnification scanning electron microscope (SEM) images of the CuS/Au-coated velour fabric.
Figure 14:
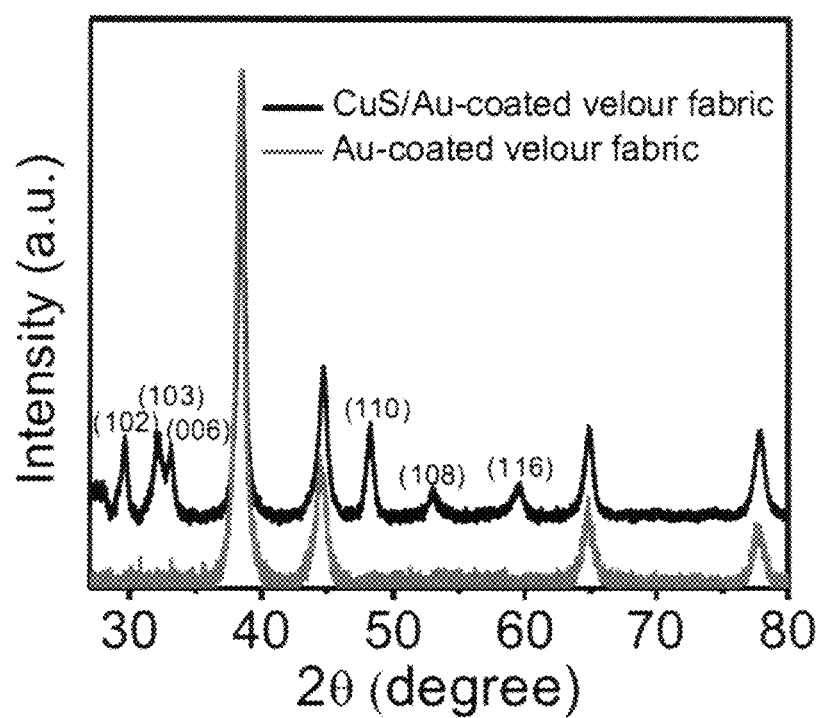
FIG. 14 shows X-ray powder diffraction (XRD) diffractograms of the the Au-coated (red) and CuS/Au-coated (black) velour fabrics.
Figure 15:
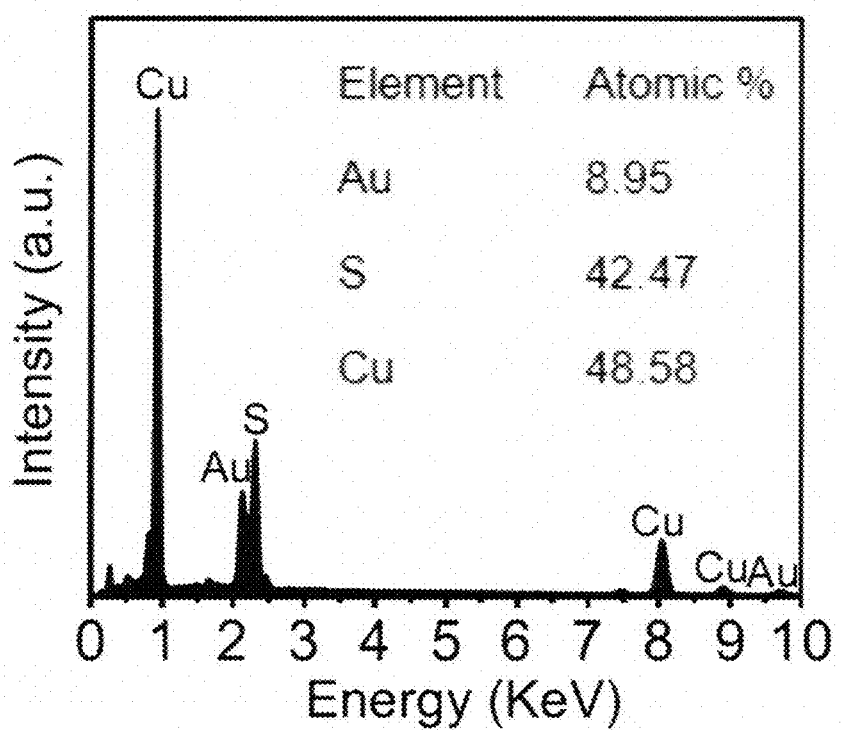
FIG. 15 shows an energy-dispersive X-ray spectroscopy (EDX) spectrum of the CuS/Au-coated velour fabric.

As seen in FIG. 12, SEM images of Au (image "d"), Cu/Au (image "e") and CuS/Au (image "f") coatings show that these materials all form conformal coatings over the surfaces of the individual fibers of the cut pile. Higher magnification SEM image shows that the CuS coating on the cut pile fibers is composed of nanograins, as seen in FIG. 13. X-ray diffraction (XRD) analysis revealed that the CuS nanograins possess a hexagonal phase, as seen in FIG. 14. All the identified peaks except the intense diffraction peaks from Au in the XRD pattern can be ascribed to the hexagonal covellite CuS phase (JCPDS No. 06-0464). The EDX spectrum also shows that the atomic ratio of Cu to S was approximately 1:1, agreeing well with the expected stoichiometry of CuS, as seen in FIG. 15.

Characterization (Electrical and Electrochemical Properties)

CuS has been investigated as an electrode material for LIBs because of its high theoretical capacity, flat discharge curves, and good conductivity. CuS is furthermore environmentally friendly and elementally abundant on earth. It stores lithium ions based on the two-step reversible conversion reaction between CuS and Li$^+$ Reactions are idealized as equations (1) and (2), but are more complex with other types of intermediate products formed besides $Cu_2S$ in reaction (1):

$$2CuS + 2Li^+ + 2e^- \rightarrow Cu_2S + Li_2S \quad (1)$$

$$Cu_2S + 2Li^+ + 2e^- \rightarrow 2Cu + Li_2S \quad (2)$$

The reaction between CuS and Li$^+$ has a high theoretical capacity of 560 mAh/g, which is higher than conventional electrode materials, such as $LiCoO_2$ (274 mAh/g) and $LiFePO_4$ (170 mAh/g).

Figure 16:
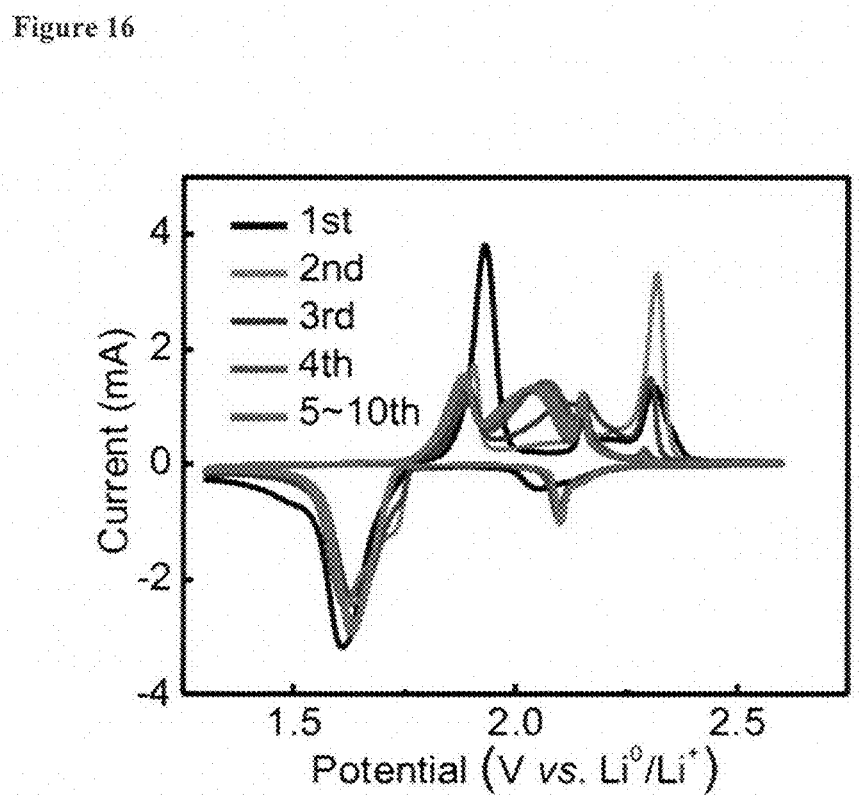
FIG. 16 shows cyclic voltammetry (CV) curves of the CuS/Au-coated velour fabric at 0.1 mV/s.
Figure 17:
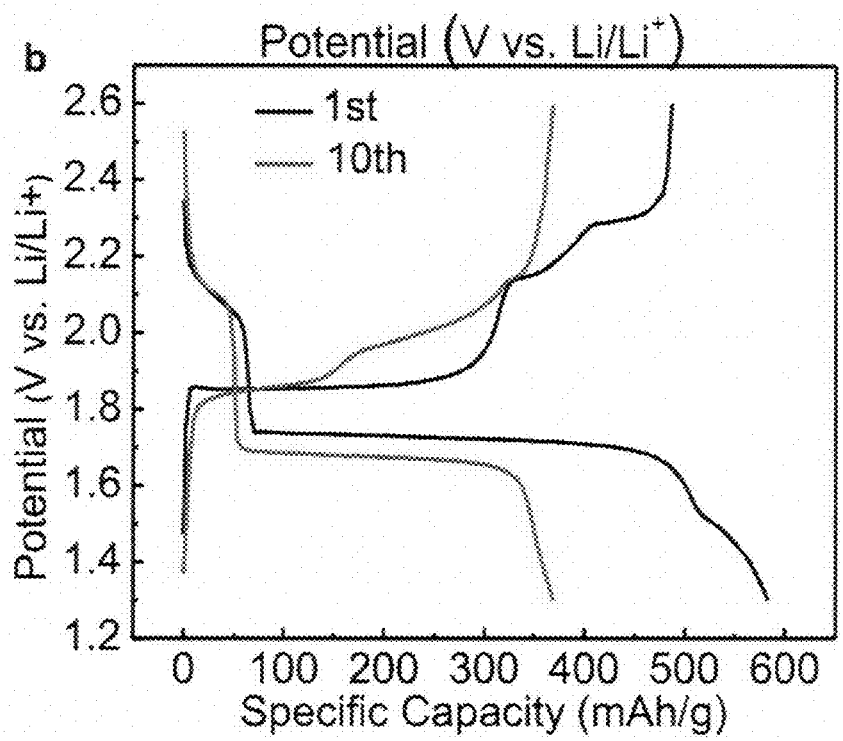
FIG. 17 shows a line graph illustrating charge-discharge profiles of the CuS/Au-coated velour fabric at 0.5 C (1 C=560 mA/g) in 1.3 to 2.6 V.

We investigated the electrochemical properties of the CuS on the cut pile of the velour fabric LIB electrode using a coin-cell type configuration with the velour fabric LIB electrode as the working electrode and a lithium foil as the counter electrode. Cyclic voltammetry (CV) curves of the cell from 1.3 to 2.6 V at a scan rate of 0.1 mV/s showed the electrode underwent a gradual evolution of oxidation and reduction processes during the first 4 cycles, stabilizing in the 5th cycle, as seen in FIG. 16. In the first CV curve, there are three oxidation peaks at 1.9 V, 2.2 V, and 2.3 V and two reduction peaks at 1.6 V and 2.0 V, similar to previously reported studies of CuS-based electrodes. After stabilization, the three oxidation peaks shift to 1.9 V, 2.0 V and 2.2 V, and the two well-defined reduction peaks shift to 1.7 V and 2.1 V. The oxidation peaks shift to lower potential and reduction peaks shift to higher potential, resulting in narrower peak intervals that are consistent with the reduced polarization of the velour fabric LIB electrode. The galvanostatic charge and discharge profile measured in the potential range of 1.3 V to 2.6 V (vs. Li$^0$/Li$^+$) at 0.5 C exhibited three charge plateaus and two discharge plateaus well-matched with the peak positions in the CV curves, as seen in FIG. 17. The discharge plateau at 2.1 V corresponds to the Li diffusion into the covellite CuS lattice to form $Cu_2S$ and $Li_2S$ (equation (1)), while the plateau at 1.7 V corresponds to further diffusion of lithium resulting in the conversion reaction forming Cu and $Li_2S$ (equation (2)).

Figure 18:
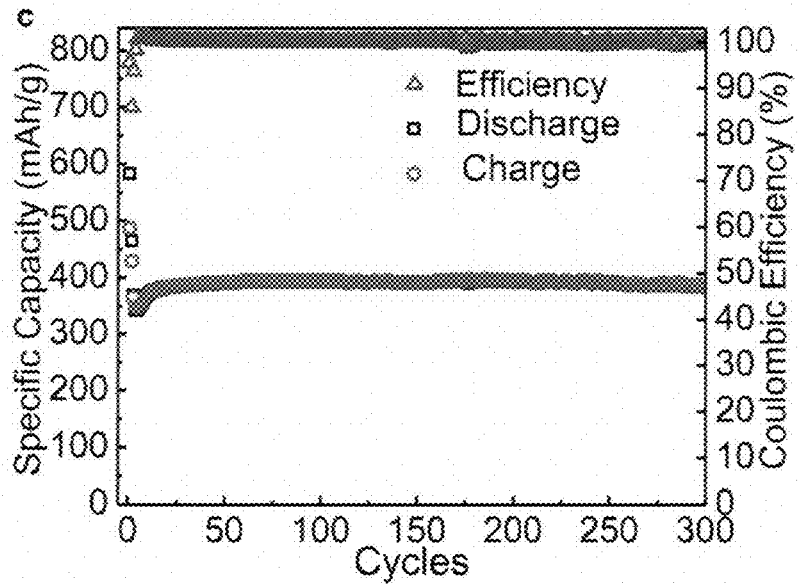
FIG. 18 shows a plot graph illustrating specific capacity and Coulombic efficiency (y-axis) over different cycles (x-axis) of the CuS/Au-coated velour fabric at 0.5 C (1 C=560 mA/g) in 1.3 to 2.6 V.

The velour fabric LIB electrode exhibited excellent cycling stability, electrochemical reversibility, and rate capability. We assessed the charging-discharging cycling stability at 0.5 C (see FIG. 18). The initial discharge capacity of 583 mAh/g, which was calculated based on the mass loading of CuS, is followed by a decrease and increase, indicating the activation process in the material. The initial decrease in capacity could be due to irreversible non-Faradaic storage, the formation of a solid electrolyte interface layer, and/or partial dissolution of lithium polysulfides, arising from the initial few discharge-charge cycles. After activation and stabilization, the electrode exhibited a specific capacity of ~400 mAh/g with no obvious sign of capacity decay for at least 300 cycles. The corresponding Coulombic efficiency was close to 100%, indicating excellent electrochemical reversibility during the charging and discharging process. The specific capacity of the velour fabric LIB electrode is comparable to previously reported values (~440 mAh/g) for conventional CuS composite electrodes, which were also calculated based on the mass of CuS. The velour fabric LIB electrode shows better cycling stability than in previous reports, which have shown that CuS suffers from severe capacity decay in the charge-discharge process due to the dissolution of lithium polysulfides into the electrolyte and shuttling away from the electrode. We hypothesize that the excellent cycling stability of the velour fabric LIB electrode may be due to favorable chemical interactions between the gold coating on the fabric and the polysulfides.

Figure 19:
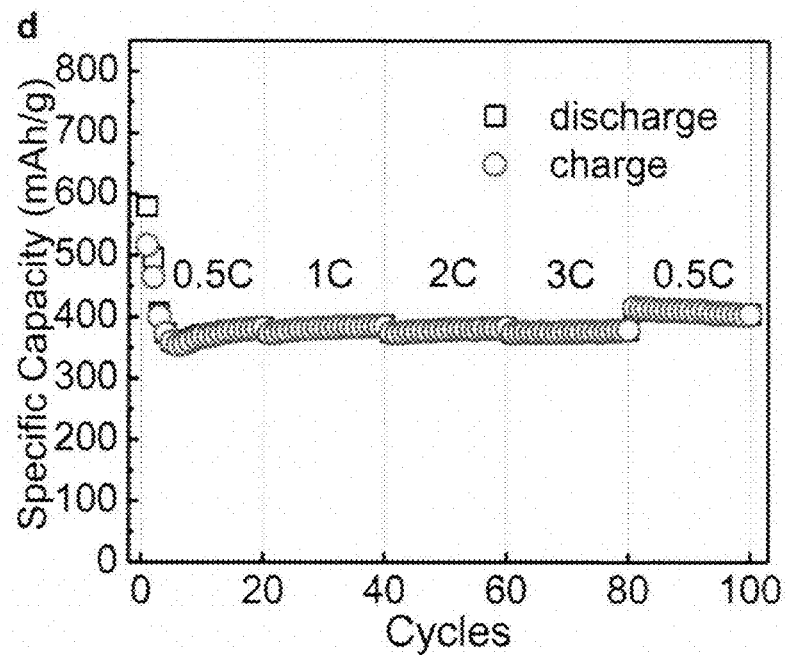
FIG. 19 shows a plot graph illustrating specific capacity (y-axis) over different cycles (x-axis) of the CuS/Au-coated velour fabric at various current rates of 0.5 C, 1 C, 2 C, 3 C and 5 C.
Figure 28:
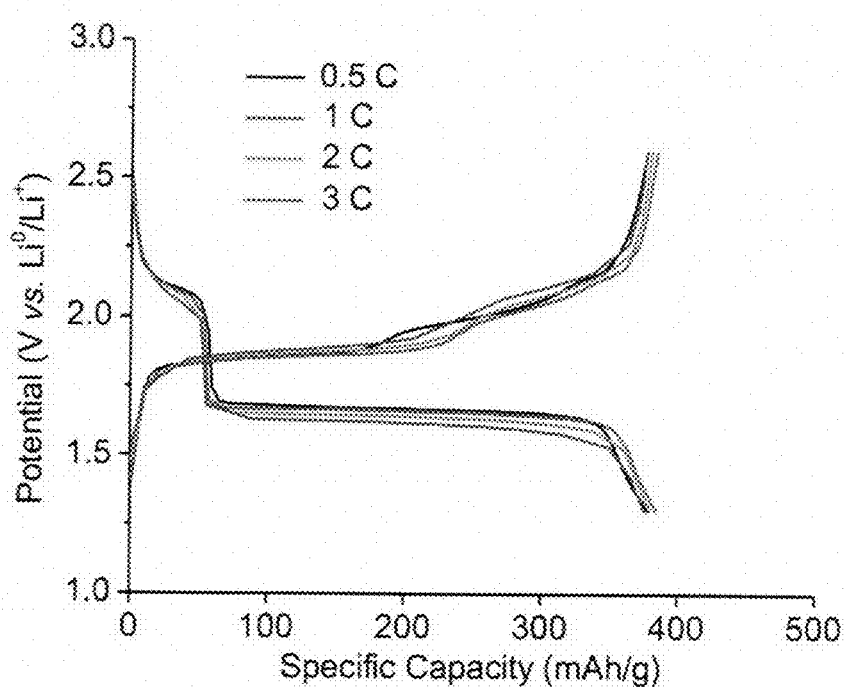
FIG. 28 shows charge-discharge profiles of the velour fabric LIB electrode at various current rates.

The rate performance of the velour fabric LIB electrode at sequential current rates of 0.5 C, 1 C, 2 C, 3 C, and 0.5 C, respectively, is shown in FIG. 19 and FIG. 28. There is negligible change in capacity and charge-discharge voltage plateau with the increase of current density, indicating excellent rate capability. Directly growing CuS on the Au-coated cut pile fibers, which are connected to the Au-coated framework, provides intimate and stable contact between CuS and the Au-coated framework current collector to facilitate the charge transfer process and enhance the rate capability. The porous structure of the velour fabric also may provide good accessibility of the electrolyte to CuS coating, thereby increasing the electroactive material/electrolyte contact area.

Figure 20:
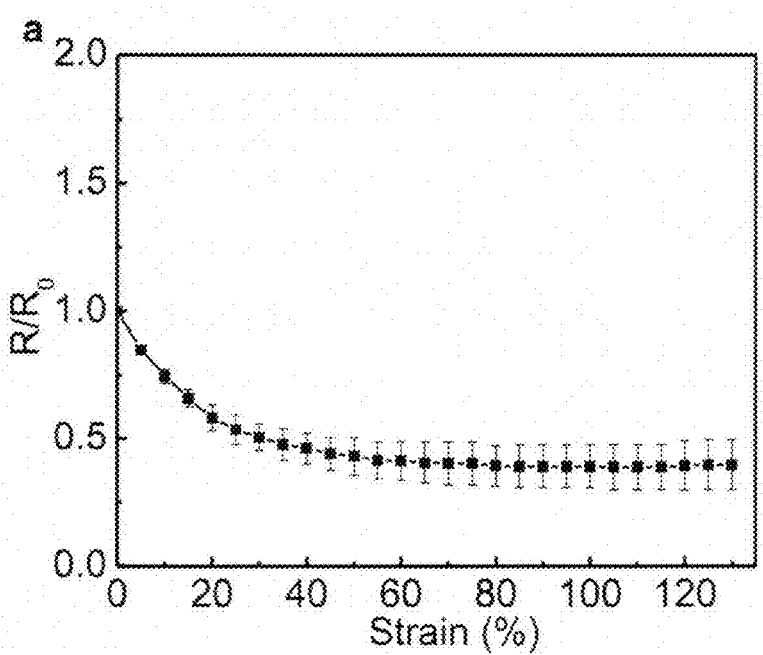
FIG. 20 shows a line graph illustrating normalized change in resistance of the CuS/Au-coated velour fabric as a function of stretching strain.
Figure 21:
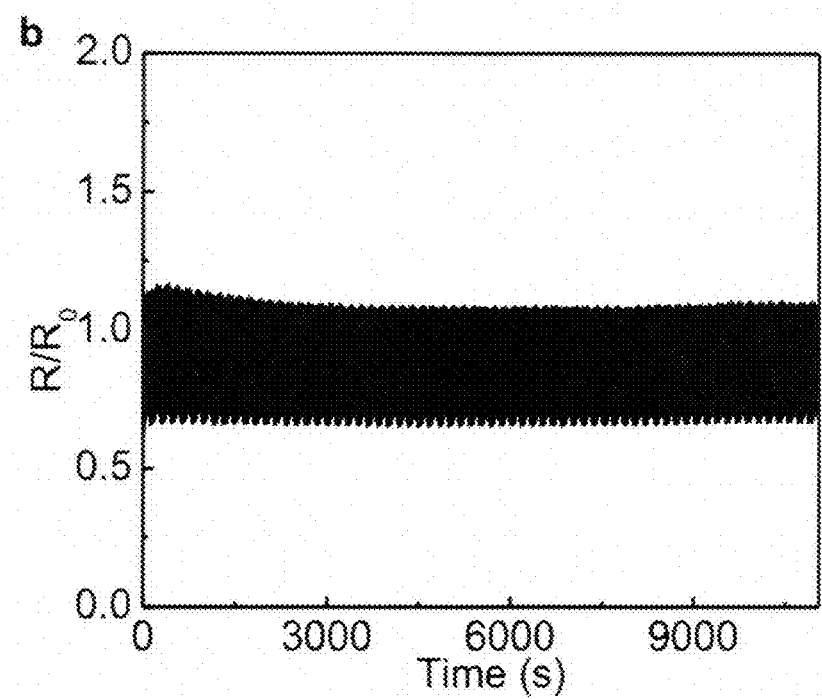
FIG. 21 shows a line graph illustrating normalized change in resistance of the CuS/Au-coated velour fabric during 1000 stretch and release cycles, where the fabric was cycled between 0 and 50% strain, and the resistance was measured after each cycle.
Figure 22:
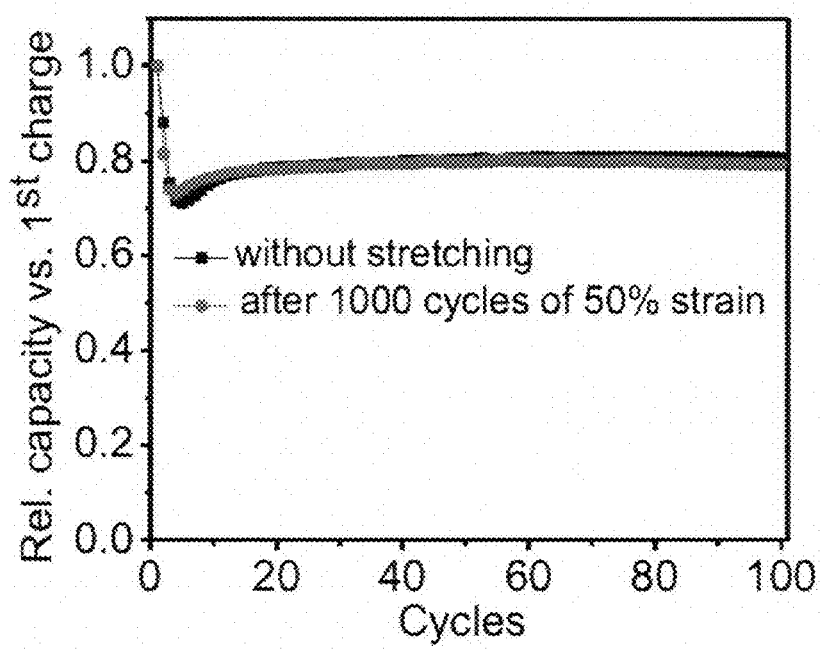
FIG. 22 shows a line graph illustrating relative capacity (y-axis) of the CuS/Au-coated velour fabric before (red circles) and after 1000 stretching cycles at 50% strain (blue squares) as a function of charge-discharge cycles.
Figure 23:
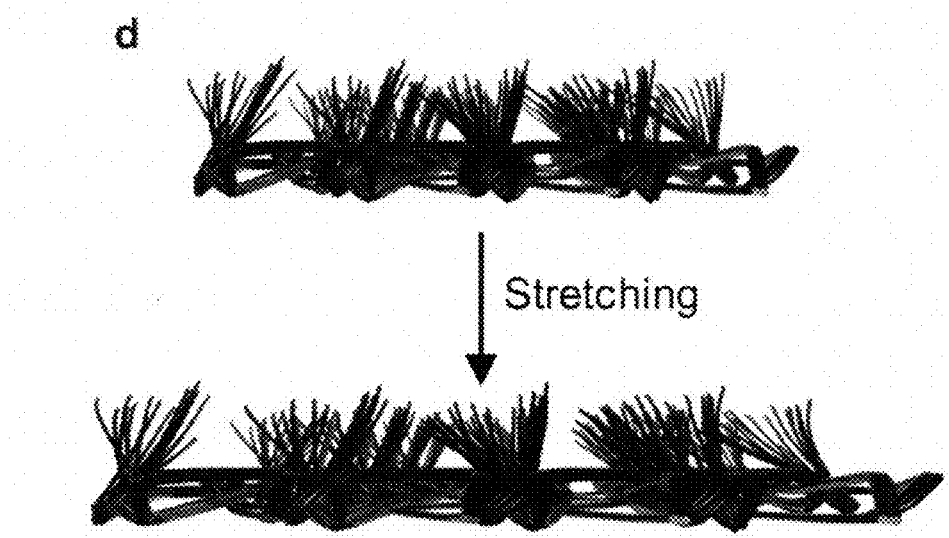
FIG. 23 shows, on the top, a lateral view of the CuS/Au-coated velour fabric in a non-stretched condition, and on the bottom, a lateral view of the fabric in a stretched condition.
Figure 24:
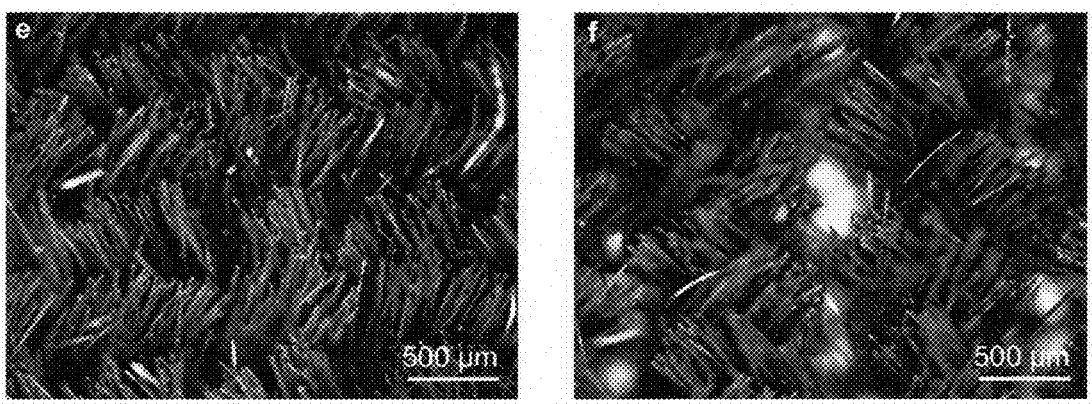
FIG. 24 shows two (2) optical microscope images of a front side of the CuS/Au-coated velour fabric in a non-stretched condition (left image) and in a stretched condition at 50% strain (right image)
Figure 25:
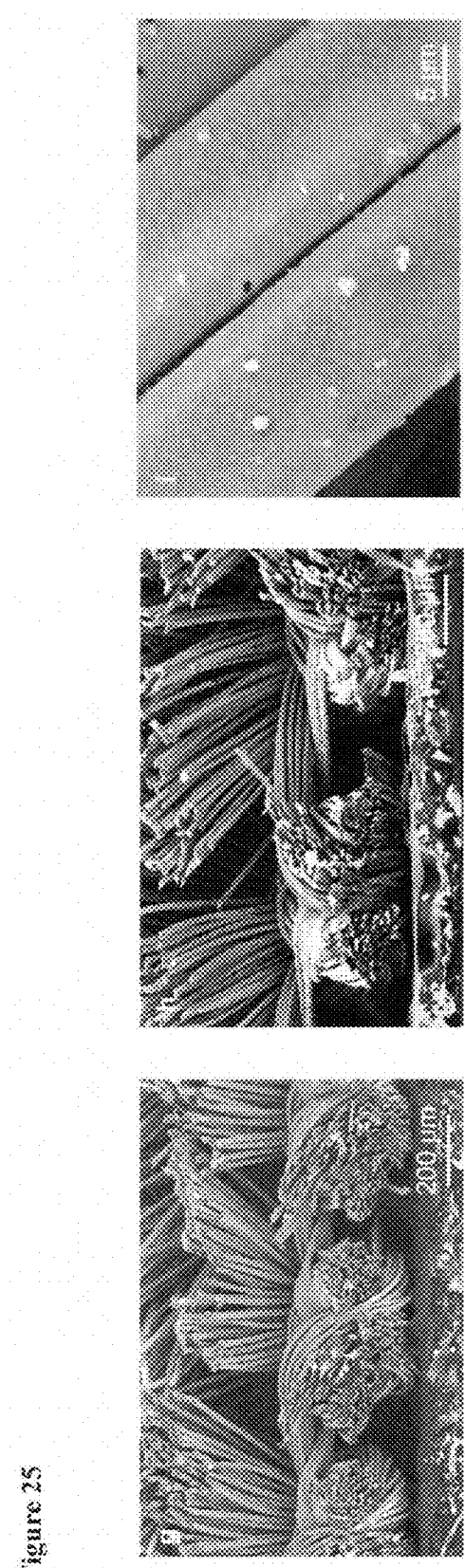
FIG. 25 shows three (2) scanning electron microscope (SEM) images of the CuS/Au-coated velour fabric in a non-stretched condition (left image) and in a stretched condition at 50% strain (middle and right images)
Figure 29:
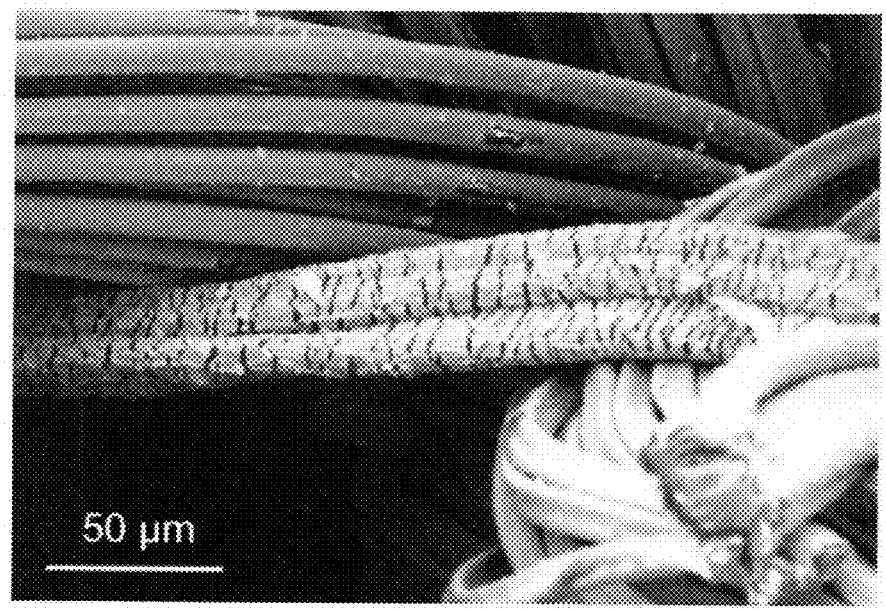
FIG. 29 shows an SEM image of velour fabric LIB electrode under 20% strain, showing the cracking of gold coating on the spandex fiber.

Electrical and Electrochemical Properties of CuS/Au-Coated Velour Fabric Under Strain Stretching the velour fabric LIB electrode illustrates the island-bridge strain-engineering architecture. Stretching elongates the Au-coated framework "bridges", while the CuS/Au-coated cut pile fiber "islands" simply ride along at their anchor points on the framework in the direction of stretching. The CuS/Au-coated cut pile fibers become separated from each other with stretching, but they do not experience tensile stress, as seen in FIG. 23. Since the skin at a joint of the human body can stretch to ~50% strain with bending in the longitudinal direction, we used this maximum strain value to characterize the velour fabric LIB electrode. Optical microscope, as seen in FIG. 24, and SEM images, as seen in FIG. 25, at 0% and 50% strain show the separation of the CuS/Au fibres with strain. High-magnification SEM image of the CuS/Au-coated cut pile fiber at 50% strain also showed no delamination or cracking of CuS coating, consistent with protection from strain, as seen in FIG. 25. Electrical and electrochemical performance metrics during stretching support the functionality of the island-bridge architectural strain-engineering design. The Au-coated framework current collector acts as the "bridge" component of the architecture by remaining conductive as the loops unbend and tighten with strain. The resistance measured from the back side of the Au-coated framework current collector with strain in the course direction decreased to ~50% of the initial resistance at 30% strain and then remained stable to 130% strain, as seen in FIG. 20. The initial decrease in the resistance can be attributed to the increase in contact pressure between adjacent conductive yarns in the framework that occurs with tensile strain, which lowers the interfiber contact resistance. Similar to previous literature reports, the gold coating on spandex fibers developed cracks under strain due to the mechanical mismatch between gold and spandex, as seen in FIG. 29. However, the resistance decrease due to the increased contact pressure between gold-coated yarns outweighs any increase in resistance that might be caused by this cracking. The resistance also remained relatively stable during 1000 cycles of 0 to 50% strain, as seen in FIG. 21. The CuS/Au-coated cut pile fiber "islands" anchored to the Au-coated framework "bridges" exhibit stable electrochemical performance after repetitive stretching, consistent with protection from stress by the island-bridge design. The charge-discharge cycling stability of the velour fabric LIB electrode evaluated in a coin cell after 1000 cycles of stretching at 50% strain was indistinguishable from an unstretched electrode, as seen in FIG. 22.

Table 1 below shows the unique strain-engineering architectural design of the velour fabric LIB electrode compared to those of stretchable LIB electrodes fabricated on elastomers. In the velour fabric LIB electrode, the island-bridge design comes from the architectural features that are intrinsic to the textile substrate. In contrast, elastomer-based stretchable LIB electrodes impart stretchability by either modification of the elastomer substrate using prestrain, or using lithography to connect rigid LIBs with stretchable interconnects. Performance of all of these systems, however, is suitable for applications in wearable electronics, where the movements of the body typically do not exceed 50% strain.

TABLE 1

Comparison of strain-engineering designs of stretchable LIB electrodes

| Design | Substrate | Electrochemical Performance with Strain | Stretchability | Ref. |
|---|---|---|---|---|
|  | elastomer | unchanged capacity after 500 stretching cycles at a strain of 400% | 400% | [30] |
|  | elastomer | unchanged galvanostatic charge and discharge profile at 0% and 300% strain | 300% | [34] |
|  | textile | unchanged charge-discharge cycling stability after 1000 cycles of stretching at 50% strain | 130% | This work |

Conclusions

Common, everyday fabrics contain built-in architectures that not only provide softness and stretchability to textiles, but also can form the basis for innovative architectural strain engineering strategies to produce next-generation e-textiles. We have demonstrated that the strategic use of a warp-knitted velour fabric can solve the mechanical mismatch problem between brittle LIB materials and stretchable textiles to produce robust and stretchable textile-based LIB electrodes. The CuS/Au-coated cut pile fibers and Au-coated warp-knitted framework of the velour fabric form an island-bridge strain-engineering structure in which the CuS/Au-coated cut pile fibers are isolated from strain. This work is an important step toward stretchable textile-based LIBs since the battery electrode mainly determines the mechanical properties of the entire battery. Advancing from the stretchable velour fabric LIB electrode to fully stretchable and wearable LIBs will require further development of stretchable separators, solid electrolytes, and packing materials.

This textile-based island-bridge architecture is not exclusive to velour fabrics. These structures are also built into many different tufted fabrics, such as faux fur, plush, and velvet. These textiles comprise diverse materials, densities and lengths of the cut piles, and framework structures. The stable electrical and electrochemical performance of the velour fabric LIB electrode may thus be further improved not only by conventional optimization of the active materials to increase capacity but also by changing the structure of the fabric to increase the density of cut piles, thereby increasing the available surface area and loading of active materials. Furthermore, the great variety of textile structures provides many opportunities to use commonplace textiles as the basis for strain-engineering architectural designs to integrate different functional materials and enable a wide range of e-textile applications.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. A method for preparing a modified fabric composition for use as an electrode, the method comprising:
   providing a fabric member comprising a stretchable fabric framework defining a deformable plane and a plurality of projections coupled to the stretchable fabric framework at a distance from each other and extending at an angle from the plane;
   depositing a conductive coating on the fabric framework; and
   depositing an electroactive coating on the projections, wherein the electroactive coating is electrically coupled to the conductive coating,
   wherein the fabric member comprises a warp-knitted velour fabric comprising as the fabric framework a warp-knitted fabric framework and a cut pile as the projections, wherein the warp-knitted fabric framework and the cut pile are formed with one or more of a polyester yarn and a spandex yarn.

2. The method of claim 1, wherein the conductive coating comprises silver, copper, gold, aluminum, calcium, beryllium, rhodium, magnesium, molybdenum, iridium, tungsten, zinc, cobalt, cadmium, nickel, ruthenium, lithium, iron, platinum, palladium or tin, or the electroactive coating comprises graphite, graphene, a metal oxide, a metal sulfide, a metal selenide, a metal phosphate, a metal phosphide, a conjugated polymer or a conductive or electroactive composite thereof.

3. The method of claim 1, wherein said depositing the conductive coating comprises conducting an electroless nickel immersion gold (ENIG) to thereby deposit gold on the fabric framework, and optionally on the projections.

4. The method of claim 3, wherein said depositing the electroactive coating comprises conducting an electroless copper deposition on the projections, followed by solution sulfurization, to thereby deposit copper sulfide on the projections.

5. The method of claim 4, wherein the fabric framework comprises opposing first and second fabric surfaces along the deformable plane, the projections extending from the first fabric surface, and wherein said conducting the ENIG is selected to deposit the gold on the fabric framework and the projections, and said conducting the electroless copper deposition and the solution sulfurization is selected to deposit copper sulfide on the projections and maintain the gold on the second fabric surface.

6. The method of claim 5, further comprising blocking the second fabric surface prior to said conducting the electroless copper deposition, wherein said conducting the electroless copper deposition is catalyzed by the gold deposited on the projections, and said conducting the solution sulfurization comprises immersing the fabric member in a solution comprising elemental sulfur and carbon disulfide.

7. The method of claim 4, wherein said copper sulfide has the formula CuS, and optionally wherein said CuS comprises a nanograin structure having a hexagonal phase.

* * * * *